(12) United States Patent
Hutson

(10) Patent No.: US 9,981,741 B2
(45) Date of Patent: May 29, 2018

(54) UNMANNED AERIAL VEHICLE

(71) Applicant: QUALCOMM Incorporated, San Diego, CA (US)

(72) Inventor: Donald Bolden Hutson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 14/858,973

(22) Filed: Sep. 18, 2015

(65) Prior Publication Data

US 2016/0185454 A1    Jun. 30, 2016

Related U.S. Application Data

(60) Provisional application No. 62/096,829, filed on Dec. 24, 2014.

(51) Int. Cl.
*B64C 27/08* (2006.01)
*B64C 39/02* (2006.01)

(52) U.S. Cl.
CPC ...... *B64C 39/024* (2013.01); *B64C 2201/027* (2013.01); *B64C 2201/042* (2013.01); *B64C 2201/127* (2013.01)

(58) Field of Classification Search
CPC ............ B64C 39/024; B64C 2201/027; B64C 2201/042; B64C 2201/127; B64C 2201/108; B64C 2201/088
See application file for complete search history.

(56) References Cited

U.S. PATENT DOCUMENTS

| | | | |
|---|---|---|---|
| 2009/0008499 A1* | 1/2009 | Shaw | B64C 27/20 244/17.23 |
| 2013/0105635 A1* | 5/2013 | Alzu'bi | B64C 39/024 244/23 A |
| 2014/0145026 A1* | 5/2014 | Skjersaa | B64D 47/08 244/54 |
| 2015/0259066 A1* | 9/2015 | Johannesson | B64C 27/08 244/17.27 |
| 2016/0159471 A1* | 6/2016 | Chan | B64C 39/024 244/39 |
| 2016/0159472 A1* | 6/2016 | Chan | B64C 27/08 244/39 |
| 2016/0272310 A1* | 9/2016 | Chan | B64C 27/08 |
| 2016/0304199 A1* | 10/2016 | Chan | B64C 39/024 |

* cited by examiner

*Primary Examiner* — Philip J Bonzell
(74) *Attorney, Agent, or Firm* — Paradice and Li LLP

(57) ABSTRACT

Systems and methods are described herein related to an unmanned aerial vehicle, the unmanned aerial vehicle includes: a frame portion, two rear arms extending away from the frame portion, and at least one rear air propulsion device arranged on each of the rear arms at an orthogonal angle relative to a vertical axis. The at least one rear air propulsion device has an axis of rotation for both lift and rotation based on the angle. The unmanned aerial vehicle has two front arms arranged along a horizontal axis. The vertical axis is perpendicular to the horizontal axis. The unmanned aerial vehicle also includes at least one camera arranged on at least one of the front arms. The at least one camera faces a front direction.

28 Claims, 34 Drawing Sheets

UNMANNED AERIAL VEHICLE

CROSS-REFERENCE TO RELATED PATENT APPLICATIONS

This application claims priority from Provisional Application U.S. Application 62/096,829 filed Dec. 24, 2014, incorporated herein by reference in its entirety.

BACKGROUND

A variety of unmanned aerial vehicles have been developed, including Remote Control (RC) planes for the hobbyists, and more advanced "drones" or UAVs for military and commercial applications. Various UAV configurations and features, including for example, various "quadcopter" or four-rotor configurations, have been developed for various hobby, commercial or military applications.

SUMMARY

According to some embodiments, an unmanned aerial vehicle includes a frame portion, two rear arms extending away from the frame portion, and at least one rear air propulsion device arranged on each of the rear arms at an orthogonal angle relative to a vertical axis. The at least one rear air propulsion device having an axis of rotation for both lift and rotation based on the orthogonal angle. The unmanned aerial vehicle further includes two front arms extending away from the frame portion along a horizontal axis of the frame portion, the vertical axis is perpendicular to the horizontal axis. The unmanned aerial vehicle further includes at least one camera arranged on at least one of the front arms to face a front direction of the frame portion.

In some embodiments, the rear arms extend from the frame portion in a "V" shape.

In some embodiments, the rear arms extend from the frame portion to form an angle relative to one another, the angle being acute.

In various embodiments, the unmanned aerial vehicle further includes at least one front air propulsion device arranged on each of the two front arms to face a bottom direction of the frame portion.

In various embodiments, ends of the rear arms are elevated in a top direction as compared to the front arms, the top direction being opposite to the bottom direction. Each of the rear arms is arranged along the top direction with respect to the at least one rear air propulsion device.

In some embodiments, the axis of rotation includes a component of the bottom direction for lift.

In various embodiments, the axis of rotation includes a component of a side direction for rotation. The side direction is perpendicular to both the bottom direction and the front direction.

In various embodiments, the at least one front air propulsion device is arranged in the bottom direction of the front arms.

In some embodiments, the at least one camera is vibration isolated from the at least one front air propulsion device.

According to various embodiments, the at least one of the front arms includes a frame and a panel. The at least one camera is arranged on the panel. The at least one front air propulsion device is arranged on the frame.

In some embodiments, the unmanned aerial vehicle further includes a vibration dampener between the panel and the frame.

In various embodiments, the front arms extend from the frame portion to form a straight angle.

In various embodiments, the at least one camera includes a stereo camera.

According to some embodiments, a method for providing an unmanned aerial vehicle includes providing a frame portion and two rear arms extending away from the frame portion. The method further includes providing at least one rear air propulsion device arranged on each of the rear arms at an orthogonal angle relative to a vertical axis. The at least one rear air propulsion device having an axis of rotation for both lift and rotation based on the orthogonal angle. The method further includes providing two front arms extending away from the frame portion along a horizontal axis of the frame portion. The vertical axis is perpendicular to the horizontal axis and at least one camera arranged on at least one of the front arms to face a front direction.

In some embodiments, the method further includes arranging the rear arms to extend from the frame portion in a "V" shape.

In various embodiments, the method further includes arranging the rear arms to extend from the frame portion to form an angle relative to one another, the angle being acute.

In various embodiments, the method further includes arranging at least one front air propulsion device on each of the two front arms to face a bottom direction of the frame portion.

According to some embodiments, the method further includes elevating ends of the rear arms in a top direction as compared to the front arms. The top direction is opposite to the bottom direction. The method further includes arranging each of the rear arms along the top direction with respect to the at least one rear air propulsion device.

In some embodiments, the axis of rotation includes a component of the bottom direction for lift.

In some embodiments, the axis of rotation includes a component of a side direction for rotation. The side direction is perpendicular to both the bottom direction and the front direction.

In various embodiments, the method further includes arranged the at least one front air propulsion device in the bottom direction of the front arms.

According to various embodiments, an unmanned aerial vehicle includes a frame portion, two front arms extending away from the frame portion in side directions with respect to the frame portion, at least one camera, and at least one front air propulsion device arranged on each of the front arms to face a bottom direction of the frame portion. The unmanned aerial vehicle further includes two rear arms extending away from the frame portion in a "V" shape. The at least one rear air propulsion device arranged on each of the rear arms. The unmanned aerial vehicle further includes at least one rear air propulsion device having an axis of rotation having a component in both one of the side directions and the bottom direction.

In various embodiments, the at least one camera is arranged to face a front direction. The front direction is perpendicular to the side directions and the bottom direction.

In some embodiments, the at least one camera is arranged on the at least one of the front arms to maximize a field of view around the unmanned aerial vehicle.

In some embodiments, the at least one camera is arranged on a first component of each of the front arms. The first component is vibration isolated from the at least one front air propulsion device.

In various embodiments, the at least one camera is provided between the frame portion and the at least one front air propulsion device.

In various embodiments, the two rear arms extend from the frame portion to form an angle, the angle being acute.

In some embodiments, the at least one rear air propulsion device is elevated in a top direction of the frame portion as compared to the at least one front air propulsion device, the top direction being opposite to the bottom direction. Each of the rear arms is arranged along the top direction with respect to the at least one rear air propulsion device.

According to various embodiments, a method for providing an unmanned aerial vehicle, includes providing a frame portion and two front arms that extend away from the frame portion in side directions with respect to the frame portion. The method further includes arranging at least one camera and at least one front air propulsion device on each of the front arms to face a bottom direction. The method further includes providing two rear arms that extend away from the frame portion in a "V" shape. The method further includes arranging at least one rear air propulsion device on each of the rear arms. The at least one rear air propulsion device having an axis of rotation having a component in both one of the side directions and the bottom direction.

In some embodiments, the at least one camera is arranged to face a front direction. The front direction is perpendicular to the side directions and the bottom direction.

DETAILED DESCRIPTION

Embodiments relate to apparatuses, systems, and methods for unmanned aerial vehicles (UAVs). Particular embodiments relate to unmanned aerial vehicles having certain configurations and features relating to support frames, inductive charging, motion control, and/or structural design.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

The embodiments described herein can provide various benefits over conventional unmanned aerial vehicles. Some embodiments described herein may provide an unmanned aerial vehicle with greater maneuverability than conventional unmanned aerial vehicles. For example, certain camera location placements and V-tail configurations allow the unmanned aerial vehicle to turn within a relatively small circle or in place, to provide improved camera direction stability. Some embodiments described herein may provide an unmanned aerial vehicle with greater modularity of its component parts than conventional unmanned aerial vehicles. Some embodiments described herein may provide an unmanned aerial vehicle with better payload hauling capabilities than conventional unmanned aerial vehicles. Some embodiments described herein may provide an unmanned aerial vehicle with efficient and convenient charging mechanisms. Some embodiments described herein may provide an unmanned aerial vehicle with improved sensor stability and output accuracy. Some embodiments described herein may provide an unmanned aerial vehicle with dual-purpose structural and electrical connections. Further embodiments described herein may include various combinations of two or more (or all) of those embodiments.

Figure 1:
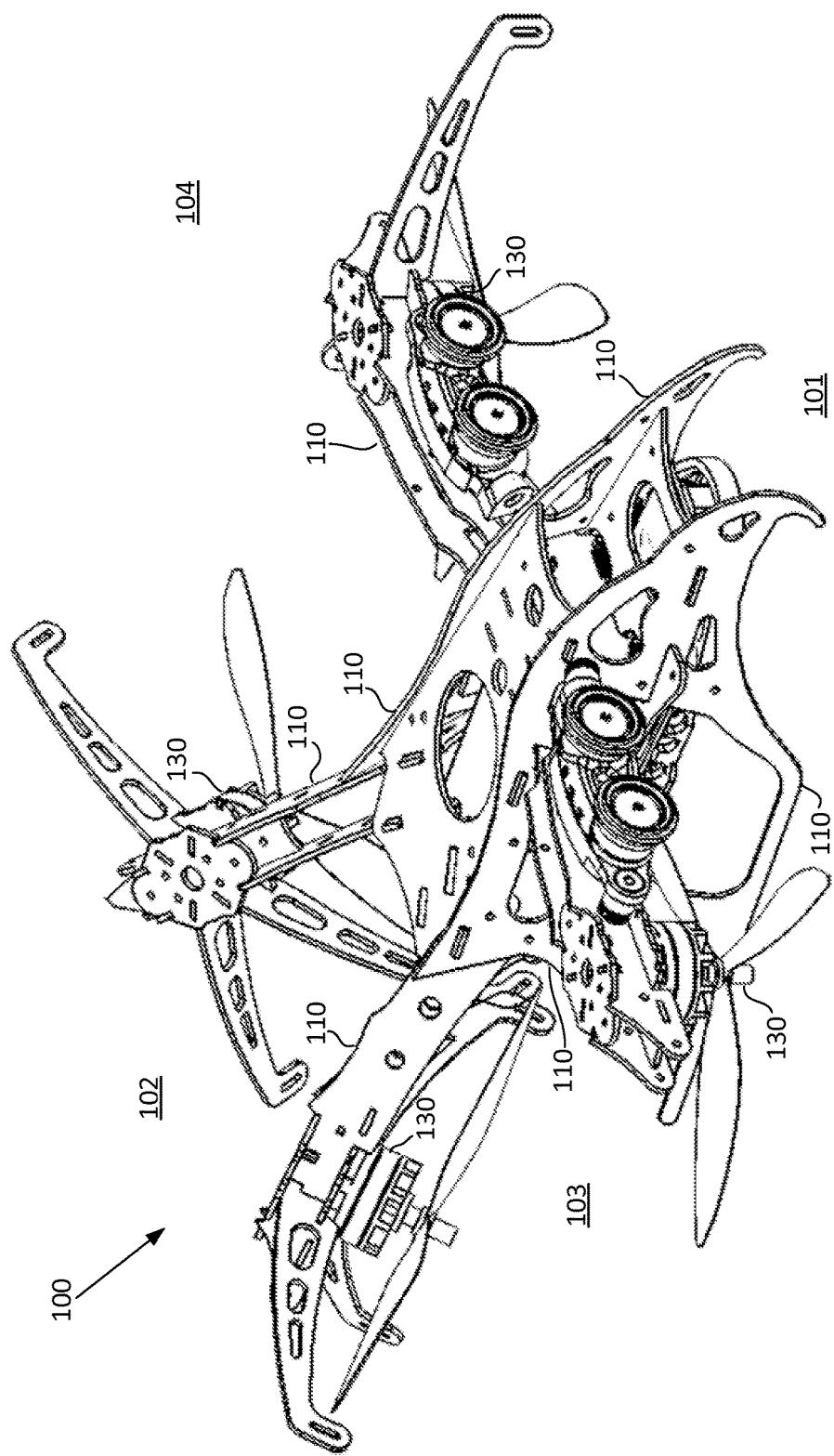
FIG. 1 shows a perspective view of an unmanned aerial vehicle according to some embodiments.

FIG. 1 shows a perspective view of an unmanned aerial vehicle 100 according to some embodiments. The unmanned aerial vehicle 100 is shown with respect to various reference directions. A front direction 101, a rear direction 102, a left direction 103, and a right direction 104 are shown. Top and bottom directions are not shown for the sake of clarity but will be identified in other figures.

The unmanned aerial vehicle 100 may have a frame or frame portion 110. The phrases "frame" and "frame portion" are used synonymously in the present description. The frame 110 may be a substantially fixed structure (or combination of structures) on which other elements of the unmanned aerial vehicle 100 may be mounted and supported.

The unmanned aerial vehicle 100 may have one or more aerial propulsion devices 130. The aerial propulsion devices 130 are illustrated as propeller assemblies in the drawings. The aerial propulsion devices 130 may each include a rotor/propeller assembly. The aerial propulsion devices 130 may each include a propeller guard. Each of these elements is illustrated in greater detail in other figures. The unmanned aerial vehicle 100 may have four pairs of rotor/propeller assemblies. While embodiments may employ aerial propulsion systems having a rotor/propeller assembly, other embodiments may employ other suitable types of aerial propulsion systems. Also, while embodiments may employ a four rotor/propeller assemblies, other embodiments may employ fewer or more rotor/propeller assemblies (or other aerial propulsion systems).

Figure 2:
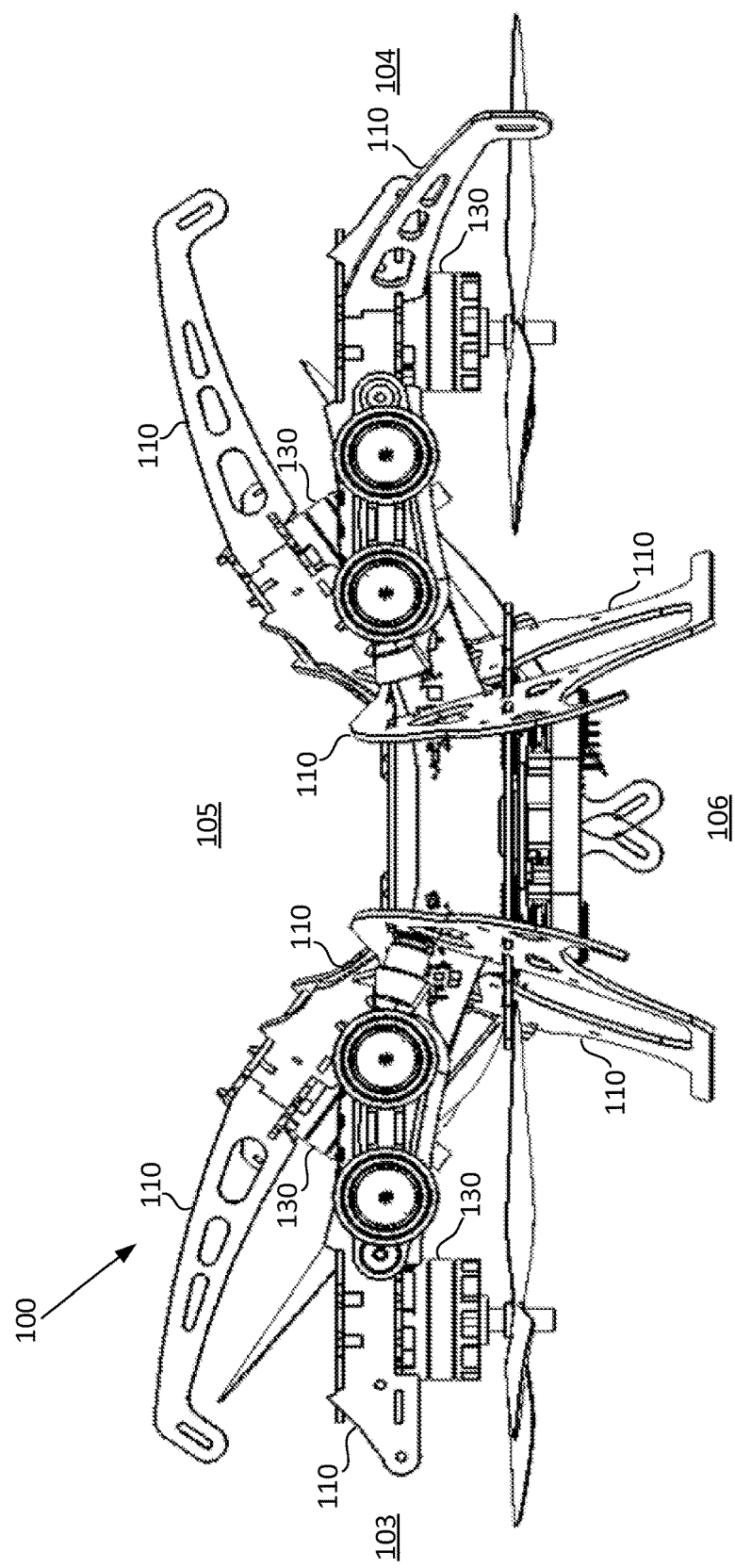
FIG. 2 shows a front view of an unmanned aerial vehicle according to some embodiments.
Figure 3:
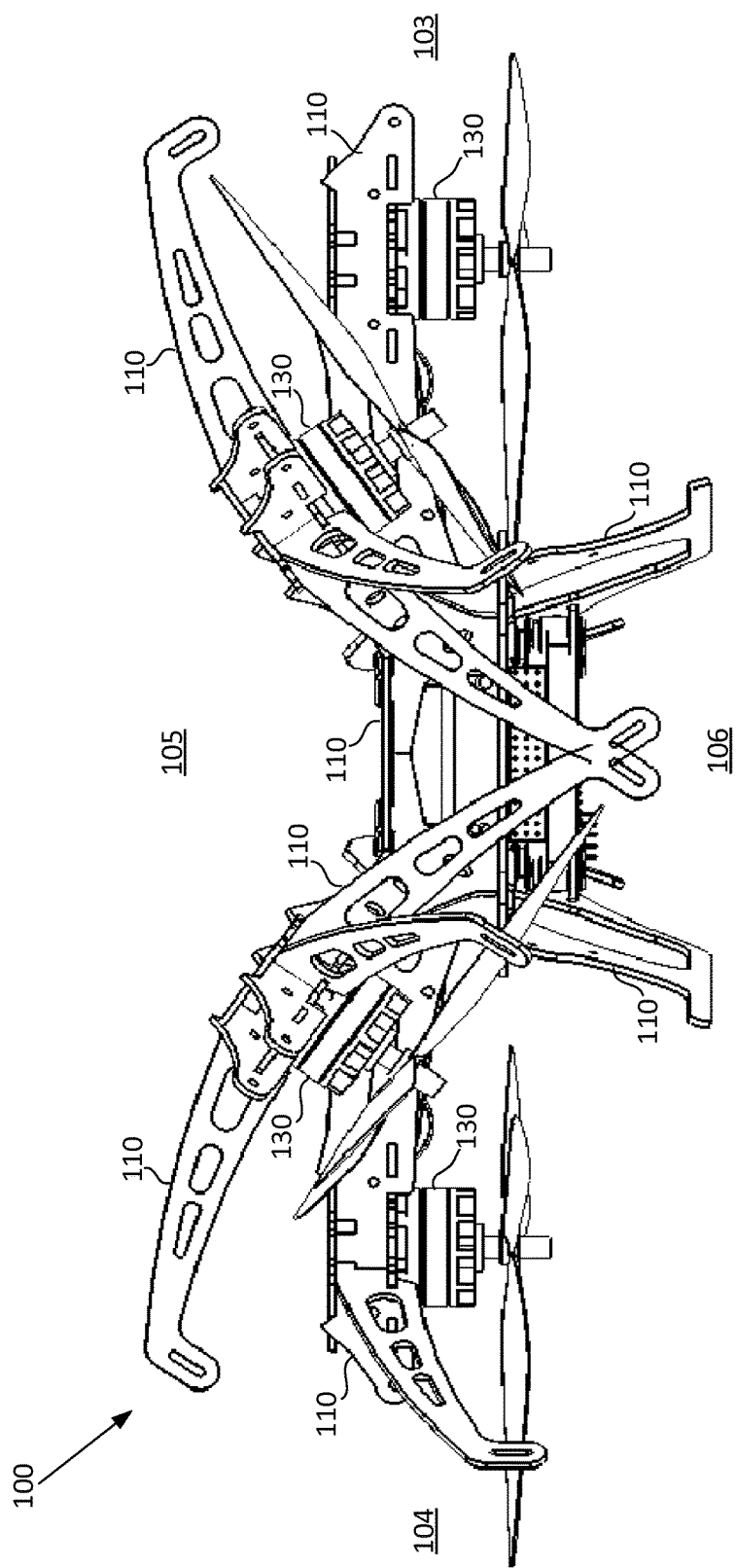
FIG. 3 shows a rear view of an unmanned aerial vehicle according to some embodiments.

FIG. 2 shows a front view of the unmanned aerial vehicle 100 according to some embodiments. FIG. 3 shows a rear view of the unmanned aerial vehicle 100 according to some embodiments. With reference to FIGS. 1-3, the unmanned aerial vehicle 100 is shown with respect to various reference directions. A top direction 105, a bottom direction 106, the left direction 103, and the right direction 104 are shown.

In some embodiments, the unmanned aerial vehicle 100 may have a first payload interface (not shown). In particular embodiments, the first payload interface may be or be arranged on a portion of the unmanned aerial vehicle 100 provided towards the bottom direction 106 or any other suitable portion of the unmanned aerial vehicle 100. The first payload interface may be designed to engage with various payload objects. Engaging with payload objects may include gripping the payload objects in order to lift them up and carry them away. Engaging with payload objects may include releasing the payload objects in order to leave the objects where released. The first payload interface may have various gripper fingers (not shown). The gripper fingers may be individually articulating fingers driven by one or more motors in order to control engaging with payload objects. In other embodiments, other suitable payload interfaces may be used.

In some embodiments, the unmanned aerial vehicle 100 may have a second payload interface (not shown) with gripper fingers (not shown). The second payload interface may be provided in a similar manner as just described for the first payload interface, except that the second payload interface is configured to engage payload objects positioned above the unmanned aerial vehicle 100. In other embodiments, other suitable payload interfaces may be used for the second payload interface.

Figure 4:
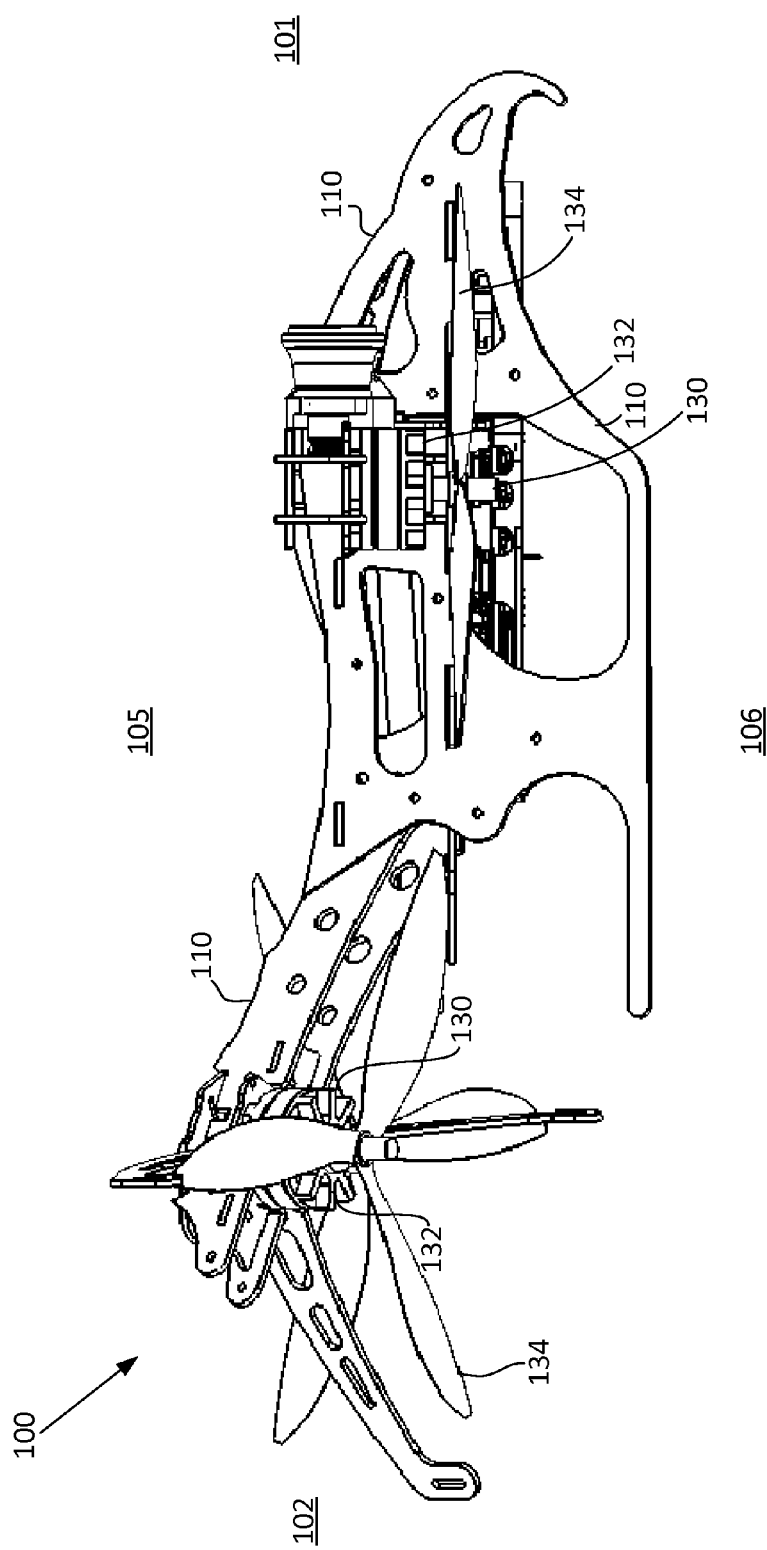
FIG. 4 shows a left view of an unmanned aerial vehicle according to some embodiments.
Figure 5:
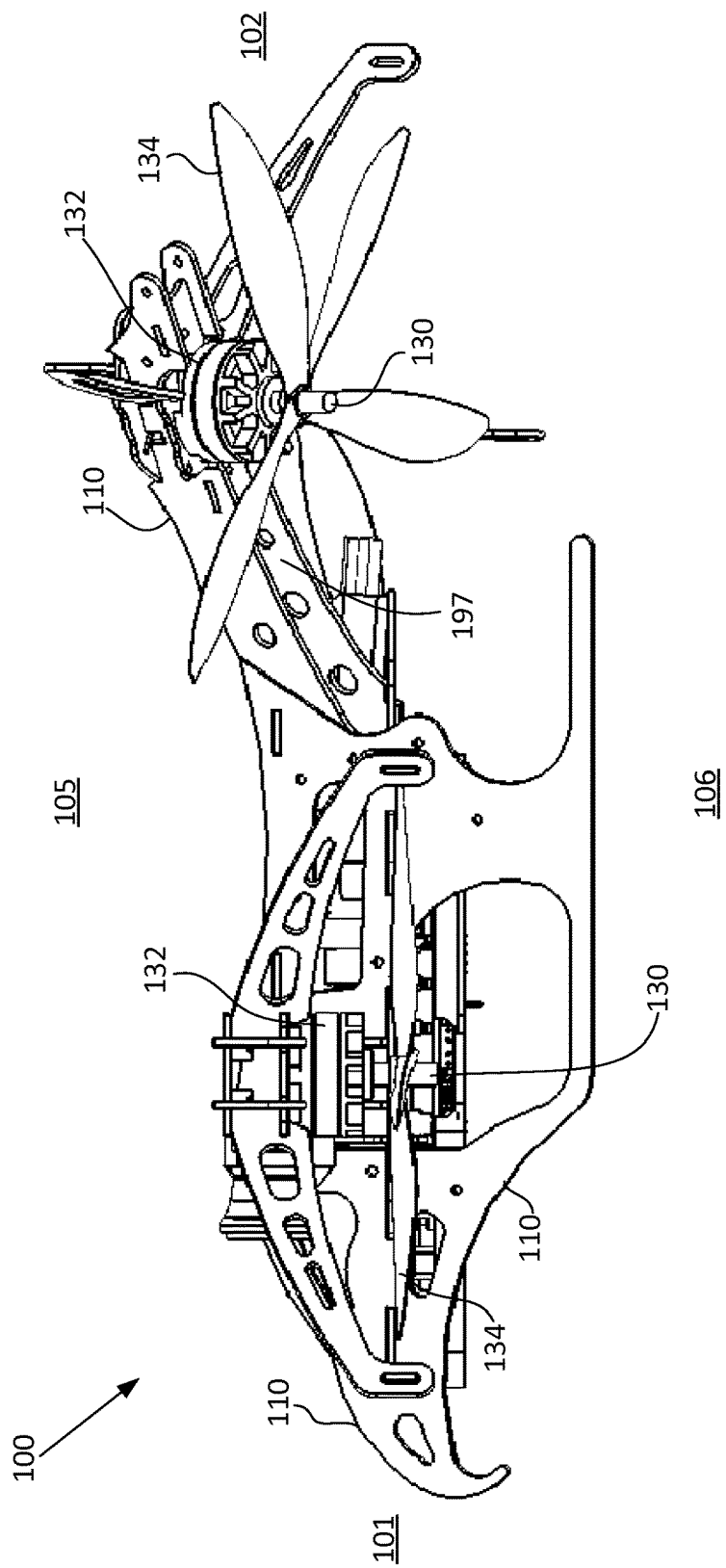
FIG. 5 shows a right view of an unmanned aerial vehicle according to some embodiments.
Figure 6:
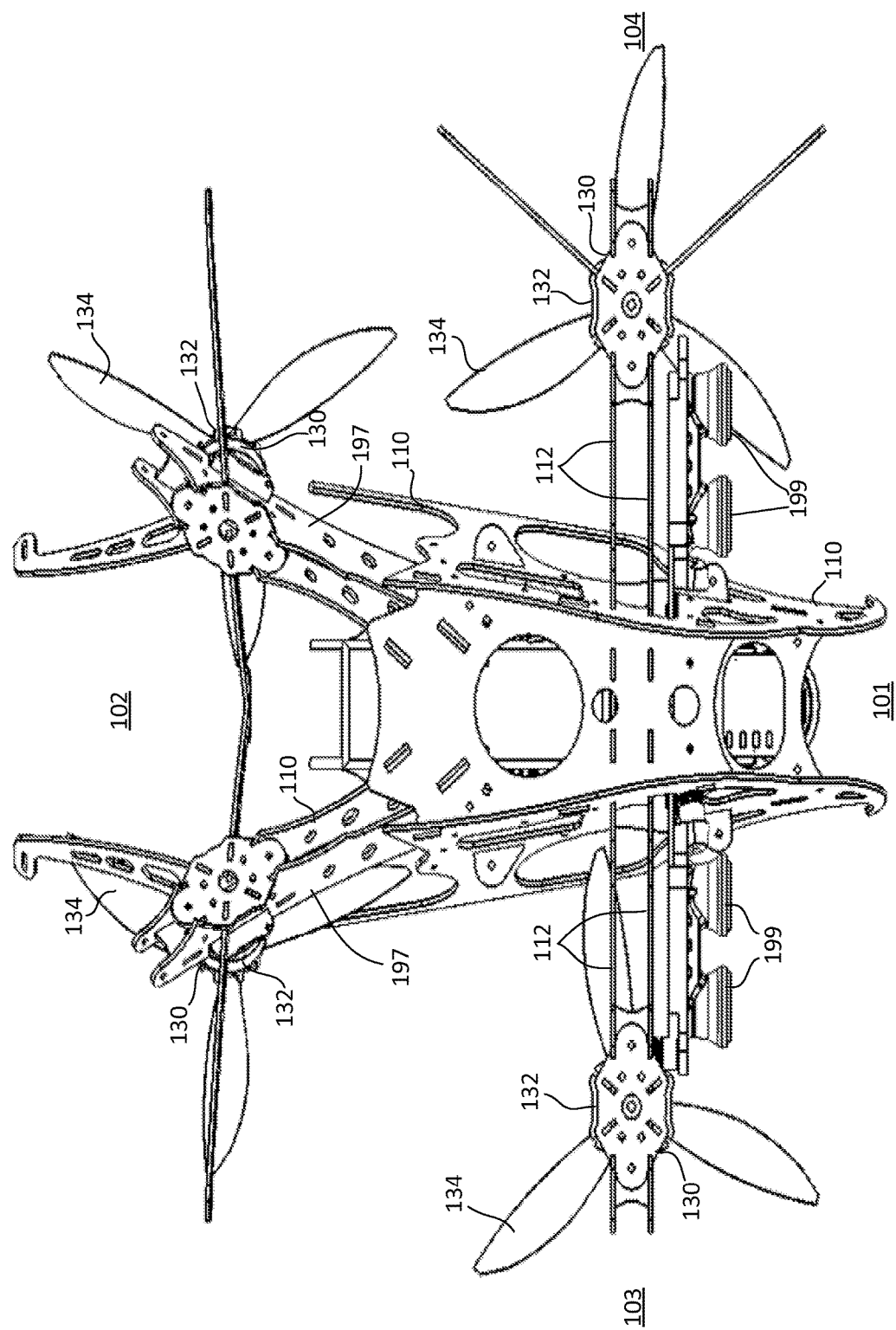
FIG. 6 shows a top view of an unmanned aerial vehicle according to some embodiments.
Figure 7:
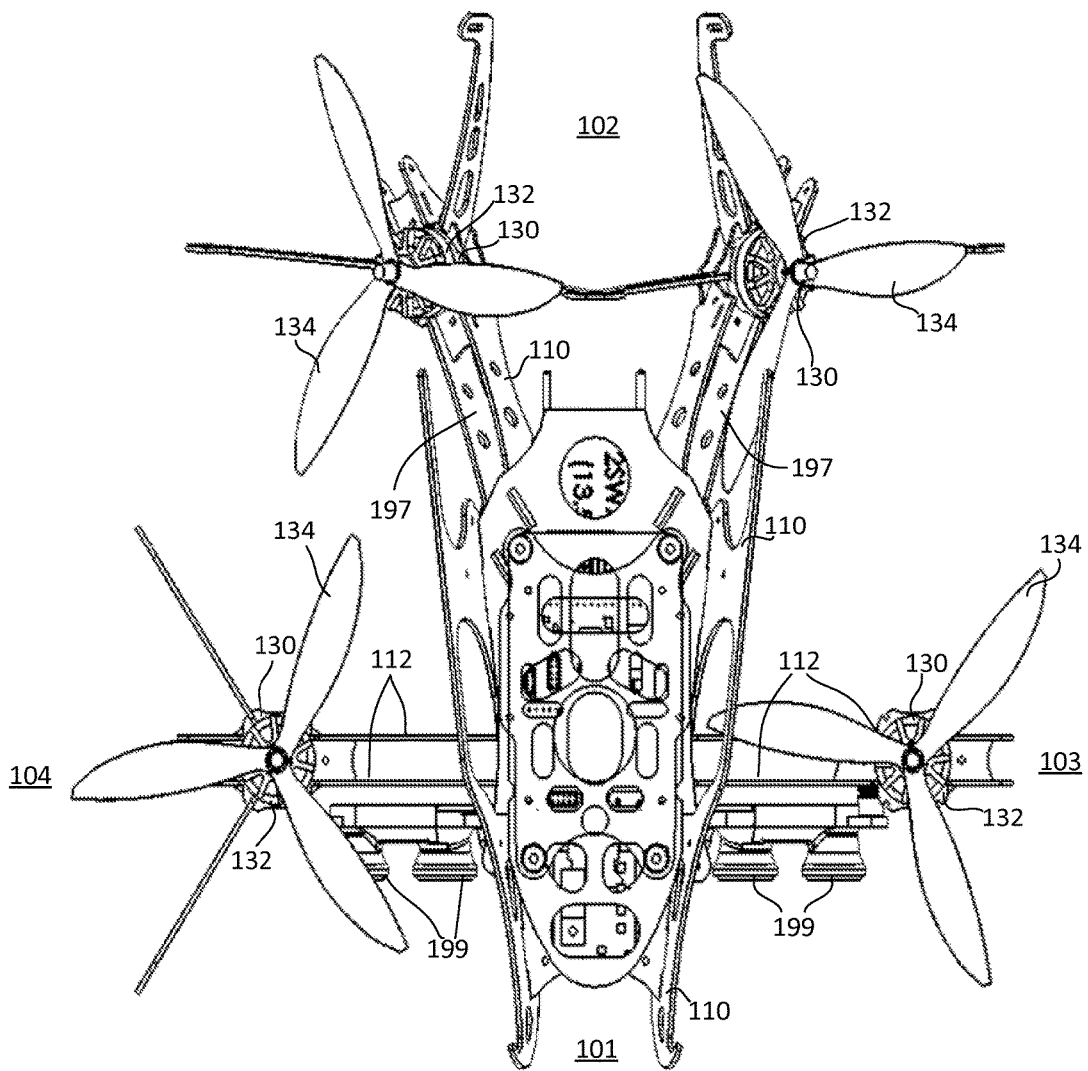
FIG. 7 shows a bottom view of an unmanned aerial vehicle according to some embodiments.

FIG. 4 shows a left view of the unmanned aerial vehicle 100 according to some embodiments. FIG. 5 shows a right view of the unmanned aerial vehicle 100 according to some embodiments. FIG. 6 shows a top view of the unmanned aerial vehicle 100 according to some embodiments. FIG. 7 shows a bottom view of the unmanned aerial vehicle 100 according to some embodiments.

With reference to FIGS. 1-7, the unmanned aerial vehicle 100 may have rotor motors 132, included as a part of aerial propulsion devices 130. Each rotor motor 132 may drive a propeller 134 (propeller blade(s)) in order to provide aerial propulsion to the unmanned aerial vehicle 100. The speed of revolution of the rotor motors 132 may be controlled by a central processor (e.g., 802 in FIG. 8) provided as part of the unmanned aerial vehicle 100. The central processor may use differences in rotational speeds of the various rotor motors 132 in order to control the motion of the unmanned aerial vehicle 100 in the air. Techniques similar to those used with quadcopters or the like may be used with the rotor motors 132 in order to control motion of the unmanned aerial vehicle 100 through the air.

In some embodiments, one rotor motor 132 may be provided on each arm, for example on a bottom surface of a rear arm 197. The rotor motor 132 may include an interface with the propeller 134. The rotor motor 132 may be arranged such that the propeller 134 (and the interface of the rotor motor 132) is pointed (at least substantially) toward the bottom direction 106. Configuration of the rotor motors 132 (and/or propellers 134) different than that shown may be used in other embodiments.

In some embodiments, a total of three propellers 134 are shown for each rotor motor 132. Configuration of propellers different than such may be used in other embodiments. In some embodiments, the unmanned aerial vehicle 100 may have propeller guards (not shown). The propeller guards may be a substantially rigid structure that prevents the propeller 134 of the various aerial propulsion devices 130 from striking objects to one or more sides (e.g., the left direction and right direction) of the unmanned aerial vehicle 100.

In various embodiments, the unmanned aerial vehicle 100 is shown as having one or more frame fixtures 112. The frame fixtures 112 may be components of the frame 110. The frame fixtures 112 may be designed to allow the attachment of various components or devices (e.g., sensor devices 199, such as cameras) to the unmanned aerial vehicle 100. For example, a first frame fixture 112 provided towards the front direction 101 of the unmanned aerial vehicle 100 may allow the connection of a vision sensor (e.g., the sensor devices 199), such as a (stereo) camera, LIDAR, or other vision system. As another non-limiting example, a second frame fixture may be provided towards the rear direction 102 of the unmanned aerial vehicle 100 to allow the connection of an audio sensor, such as a microphone or other audio system not shown. Configuration of frame fixtures and sensor attachment points other than that shown may be used in other embodiments.

Figure 8:
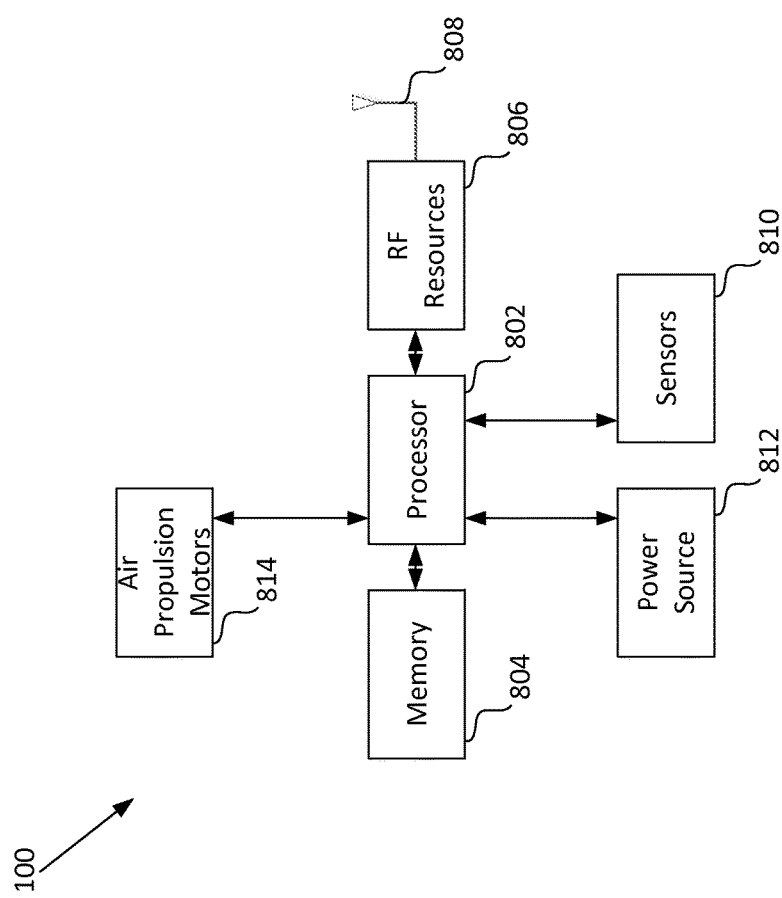
FIG. 8 shows a schematic diagram of various components of an unmanned aerial vehicle according to some embodiments.

FIG. 8 shows a schematic diagram of various components of the unmanned aerial vehicle 100 according to some embodiments. With reference to FIGS. 1-8, the unmanned aerial vehicle 100 is shown as having a processor 802 and a memory 804. The processor 802 and the memory 804 may be effective together to store and run software related to controlling the operation of the unmanned aerial vehicle 100. The processor 802 may process software related to controlling speed of rotation of air propulsion motors 814 (which may correspond to and/or be associated with the rotor motors 132 of the aerial propulsion devices 130). The processor 802 may process software related to storing or processing data received from sensors 810. The processor 802 may process software related to performing wireless communications with another device using one or more RF resources 806 and antenna 808. The processor 802 along with other components of the unmanned aerial vehicle 100 may receive electrical power from power source 812 (e.g., one or more batteries).

Figure 9:
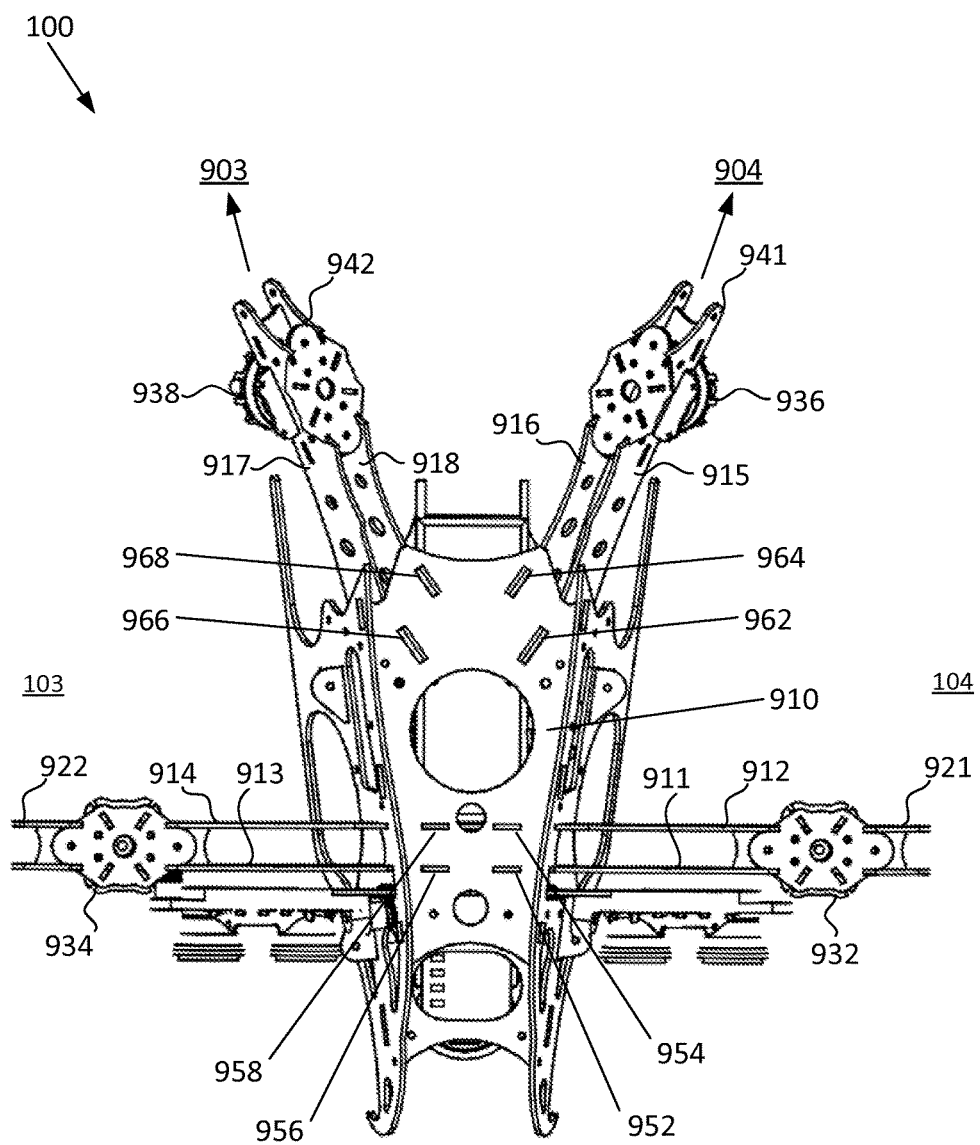
FIG. 9 shows a top view of an unmanned aerial vehicle according to some embodiments.
Figure 10B:
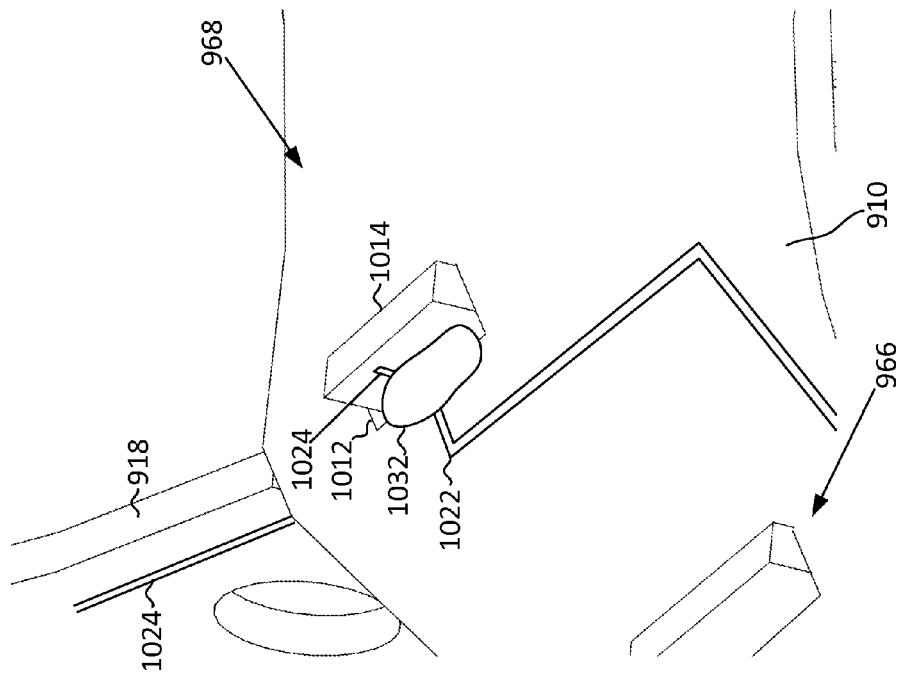
FIG. 10B shows a top view of an unmanned aerial vehicle and connection components according to some embodiments.
Figure 10A:
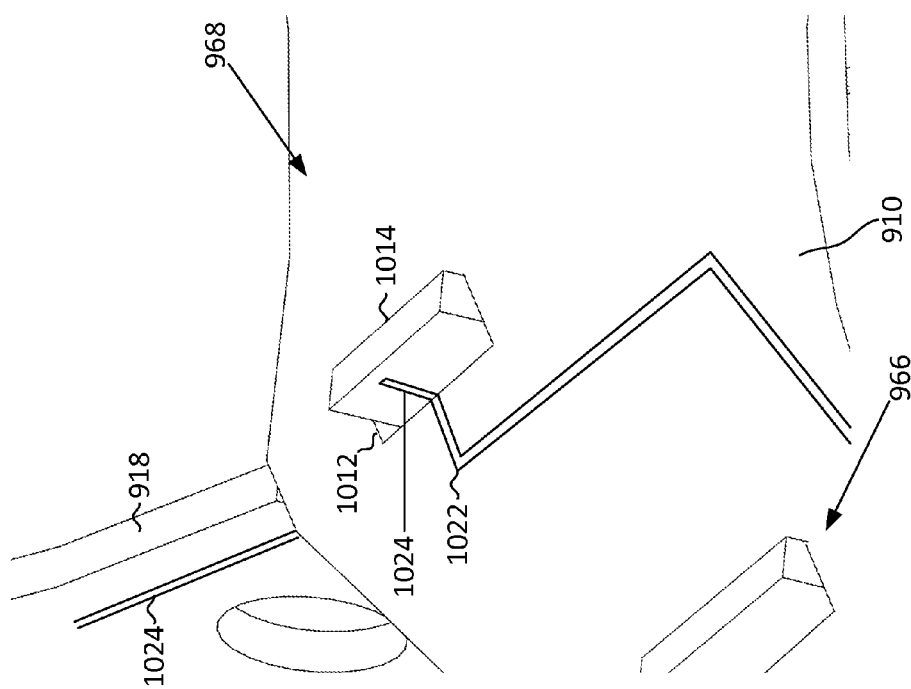
FIG. 10A shows a top view of an unmanned aerial vehicle and connection components according to some embodiments.
Figure 11B:
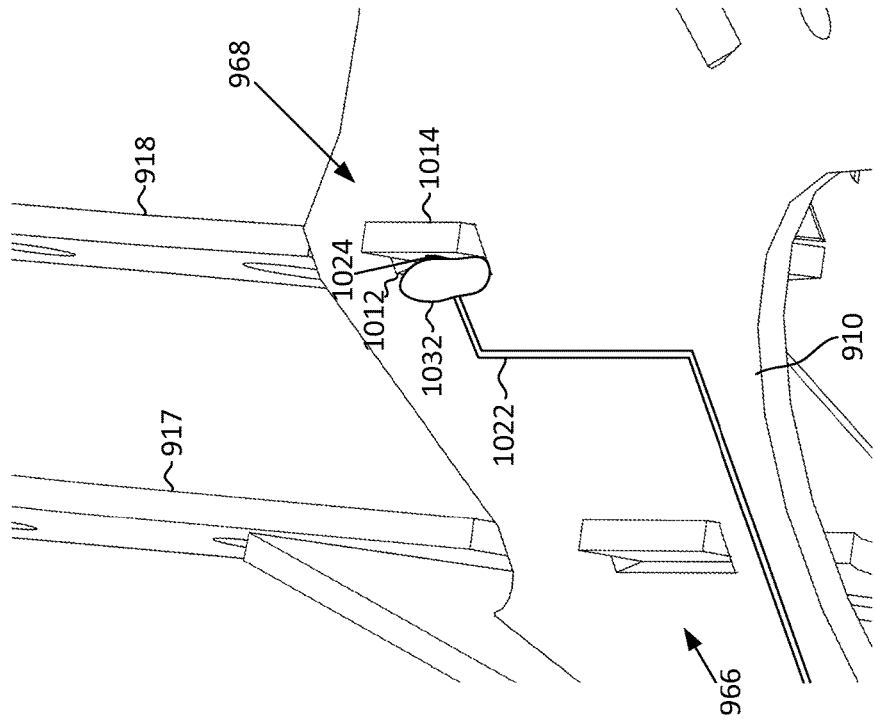
FIG. 11B shows a top view of an unmanned aerial vehicle and connection components according to some embodiments.
Figure 11A:
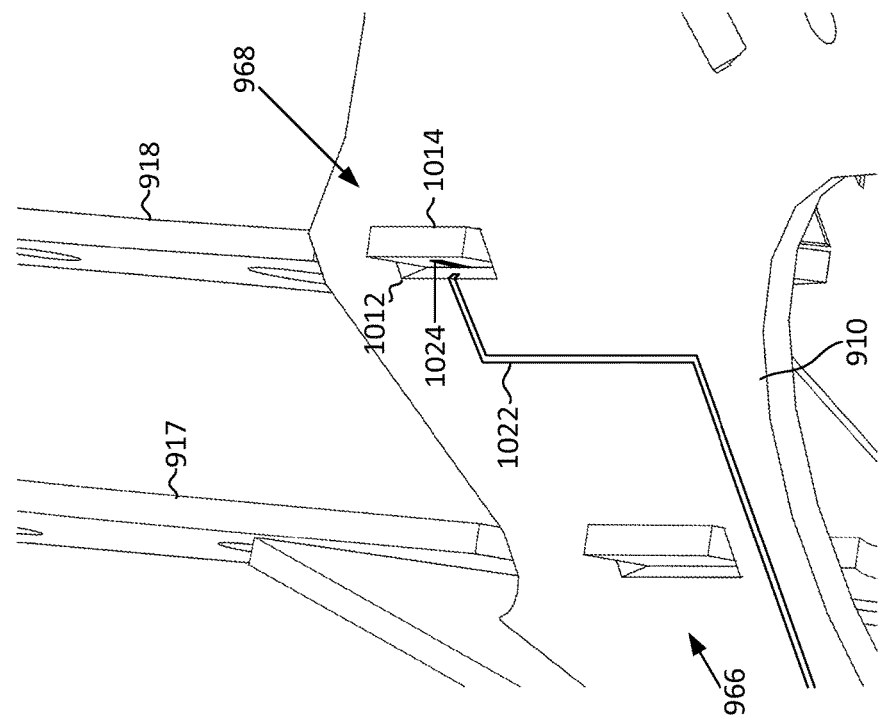
FIG. 11A shows a top view of an unmanned aerial vehicle and connection components according to some embodiments.

FIG. 9 shows a top view of the unmanned aerial vehicle 100 according to some embodiments. With reference to FIGS. 1-9, the unmanned aerial vehicle 100 may include elements that provide both electrical functionality and structural functionality. The unmanned aerial vehicle 100 may include at least a right-front arm 921 and a left-front arm 922. The right-front arm 921 may extend from the frame portion 910 in the right direction 104. The left-front arm 922 may extend from the frame portion 910 in the left direction 103. In some embodiments, the right-front arm 921 and left-front arm 922 may be a unitary component. In other embodiments, the right-front arm 921 and left-front arm 922 may be two separate components.

The unmanned aerial vehicle 100 may include at least a right-rear arm 941 and a left-rear arm 942. The right-rear arm 941 may extend from the frame portion 910 in a first extension direction 904. The left-rear arm 942 may extend from the frame portion 910 in a second extension direction 903. In some embodiments, the right-rear arm 941 and left-rear arm 942 may be a unitary component. In other embodiments, the right-rear arm 941 and left-rear arm 942 may be two separate components. The first extension direction 904 and the second extension direction 903 may be orthogonal. In various embodiments, the first extension direction 904 and second extension direction 903 may extend along and correspond to axes 1352 and 1354 (of FIG. 13), respectively.

The unmanned aerial vehicle 100 may include frame portion 910, frame portion 911, frame portion 912, frame portion 913, frame portion 914, frame portion 915, frame portion 916, frame portion 917, and frame portion 918. One or more of the frame portions 910-918 may be parts of the frame portion 110. The frame portion 910 may be a top plate on a box-frame main body section of the unmanned aerial vehicle 100.

The right-front arm 921 may be formed, for example, but not limited to, the frame portions 911 and 912. The left-front arm 922 may be formed, for example, but not limited to, the frame portions 913 and 914. The right-rear arm 941 may be formed, for example, but not limited to, the frame portions 915 and 916. The left-rear arm 942 may be formed, for example, but not limited to, the frame portions 917 and 918.

In some embodiments, the frame portions 910-918 may be constructed of printed circuit board material. In such embodiments, one or more of the frame portions 910-918 may have conductive lines provided as part of the frame portions 910-918 for transmission of electrical signals between various components of the unmanned aerial vehicle 100. In other embodiments, the unmanned aerial vehicle 100 may include external wires or other devices for the transmission of electrical signals between various components of the unmanned aerial vehicle 100.

The unmanned aerial vehicle 100 may include propulsion device 932, propulsion device 934, propulsion device 936, and propulsion device 936. Each of the propulsion devices 932, 934, 936, and 938 may be provided as described with respect to the aerial propulsion device 130. The propulsion device 932 may be mounted near a distal end of the right-front arm 921. The propulsion device 934 may be mounted near a distal end of the left-front arm. The propulsion device 936 may be mounted near a distal end of the right-rear arm 941. The propulsion device 938 may be mounted near a distal end of the left-rear arm 942.

The unmanned aerial vehicle 100 may include various connections, such as, but not limited to, connection 952, connection 954, connection 956, connection 958, connection 962, connection 964, connection 966, and connection 968. In various embodiments, each of the connections connection 952, 954, 956, 958, 962, 964, 966, and 968 may form both a structural connection and an electrical connection between the frame portion 910 and a respective component. For instance, the connection 952 may form both a structural connection and an electrical connection between the frame portion 910 and the frame portion 911. The connection 954 may form both a structural connection and an electrical connection between the frame portion 910 and the frame portion 912. The connection 956 may form both a structural connection and an electrical connection between the frame portion 910 and the frame portion 913. The connection 958 may form both a structural connection and an electrical connection between the frame portion 910 and the frame portion 914. The connection 962 may form both a structural connection and an electrical connection between the frame portion 910 and the frame portion 915. The connection 964 may form both a structural connection and an electrical connection between the frame portion 910 and the frame portion 916. The connection 966 may form both a structural connection and an electrical connection between the frame portion 910 and the frame portion 917. The connection 968 may form both a structural connection and an electrical connection between the frame portion 910 and the frame portion 918.

In some embodiments, each of the connections 952, 954, 956, 958, 962, 964, 966, and 968 may include a tongue and groove configuration wherein a tongue portion of one frame portion fits into a groove portion of another frame portion. In some embodiments, the tongue and groove configuration may then be soldered. The solder may serve to physically bind the tongue portion and the groove portion together, thereby providing a structural connection for the two connected frame portions. The solder may further serve to electrically connect an electrical input on the tongue portion to an electrical input on the groove portion, thereby providing an electrical connection for the two connected frame portions. In some embodiments, the connections 952, 954, 956, 958, 962, 964, 966, and 968 may provide a structural connection using other configuration, e.g., a bolting connection, a riveting connection, or otherwise. The connections 952, 954, 956, 958, 962, 964, 966, and 968 may be provided in other configurations in various embodiments.

FIGS. 10A-B and FIGS. 11A-B show a top view of the unmanned aerial vehicle 100 and connection components according to some embodiments. With reference to FIGS. 1-11B, the unmanned aerial vehicle 100 may include the connection 968 with slot portion 1012, tab portion 1014, and solder portion 1032. The slot portion 1012 may be an opening in the frame portion 910 through which the tab portion 1014 is configured to be received. The tab portion 1014 may be a protrusion from a proximal end of the frame portion 918 that is shaped so as to be received in the slot portion 1012. When the tab portion 1014 engages the slot portion 1012, the frame portion 918 is secured to the frame portion 910.

In various embodiments, the unmanned aerial vehicle 100 may include conductive track 1022 and conductive track 1024. The conductive track 1022 may be provided in a printed circuit board material of the frame portion 910. The conductive track 1022 may pass along or within the frame portion 910 up to the opening formed by the slot 1012. On the end not terminating at the slot portion 1012, the conductive track 1022 may be electrically connected to electronic components of the unmanned aerial vehicle, such as the processor 802 or the power source 812. The conductive track 1024 may be provided in a printed circuit board material of the frame portion 918. The conductive track 1024 may pass along or within the frame portion 918 up to and onto the tab portion 1014. On the end not terminating at the tab portion 1014, the conductive track 1024 may be electrically connected to electronic components of the unmanned aerial vehicle, such as the air propulsion motors 814 or the sensors 810.

The solder portion 1032 may be a solid element of a conductive metal alloy used to bind electrical components, generally referred to as "solder." The solder portion 1032 may be formed by applying the molten metal alloy to the point where the tab portion 1014 engages the slot portion 1012. The solder portion 1032 may physically bind the tab portion 1014 to the slot portion 1012. For example, the solder portion 1032 may physically obstruct the tab portion 1014 from sliding out of the slot portion 1014. Where the solder portion 1032 physically binds the frame portion 918 to the frame portion 910, the connection 968 may be considered to form a structural connection between frame portions of the unmanned aerial vehicle 100.

The solder portion 1032 may form an electrical connection between the conductive track 1022 and the conductive track 1024. For example, the solder portion 1032 may be an electrically conductive metal alloy that forms an unbroken physical connection between the conductive track 1022 and the conductive track 1024. Based on the electrical connection between the conductive track 1022 and the conductive track 1024, the solder portion 1032 may allow the electrical components to which the conductive track 1022 is connected (e.g., the processor 802 or the power source 812) to communicate with the electrical components to which the conductive track 1024 is connected (e.g., the air propulsion motors 814 or the sensors 810). For example, the electrical connection formed by the connection 968 may allow the processor 802 to send control signals to the air propulsion motors 814, such as the propulsion device 938 mounted at a distal end of the frame portion 918.

Figure 12B:
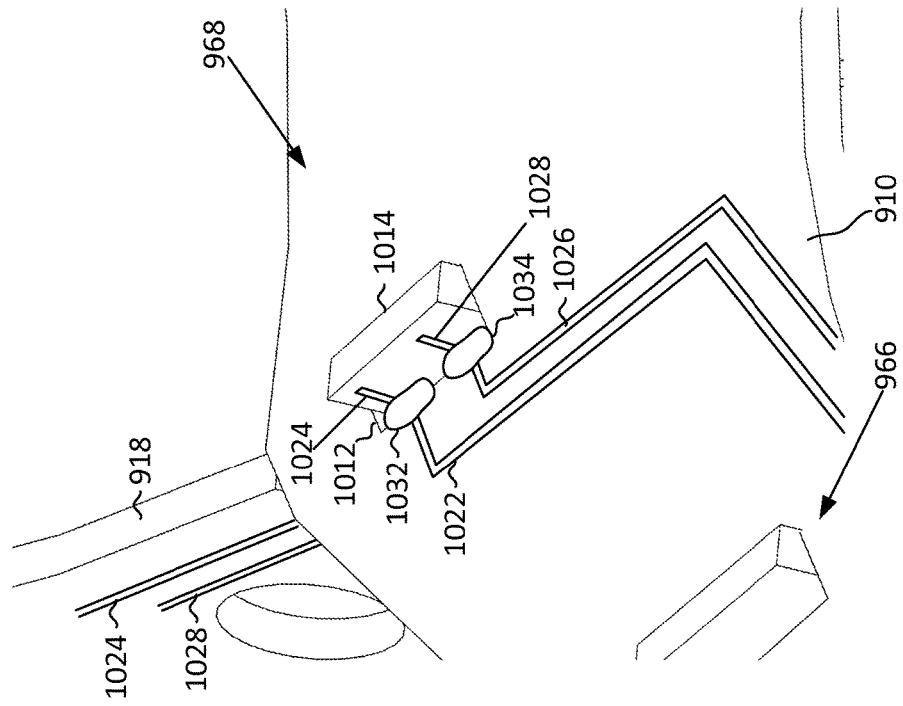
FIG. 12B shows a top view of an unmanned aerial vehicle and connection components according to some embodiments.
Figure 12A:
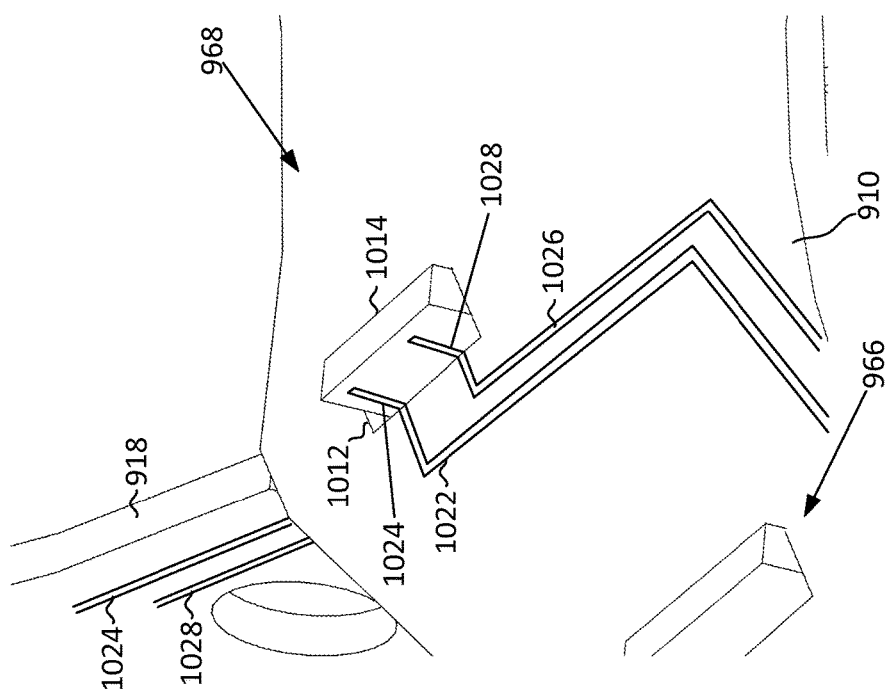
FIG. 12A shows a top view of an unmanned aerial vehicle and connection components according to some embodiments.

FIGS. 12A-B show a top view of the unmanned aerial vehicle 100 and connection components according to some embodiments. With reference to FIGS. 1-12B, the connection 968 may provide multiple electrical connections for the unmanned aerial vehicle 100.

According to some embodiments, the slot portion 1012 and the tab portion 1014 may terminate more than one conductive track each. In some embodiments, the frame portion 910 may include both the conductive track 1022 and a conductive track 1026, which both pass along or within the frame portion 910 up to the opening formed by the slot 1012. In some embodiments, the frame portion 918 may include the conductive track 1024 and a conductive track 1028, which both pass along or within the frame portion 918 up to and onto the tab portion 1014. The conductive track 1026 may be connected to the same or different electrical components as the conductive track 1022. For example, the conductive track 1022 may be connected to the processor 802, while the conductive track 1026 may be connected to the power source 812. As another example, the conductive track 1022 may be connected to the processor 802 for transmitting a first signal, while the conductive track 1024 may be connected to the processor 802 for transmitting a second signal. The conductive track 1024 may be connected to the same or different electrical components as the conductive track 1028. For example, the conductive track 1024 may be connected to the air propulsion motors 814, while the conductive track 1028 may be connected to the sensors 810. As another example, the conductive track 1024 may be connected to the air propulsion motors 814 for receiving a first signal, while the conductive track 1028 may be connected to the air propulsion motors 814 for receiving a second signal. Other configurations of the conductive tracks 1022, 1024, 1026, and 1028 are possible in various embodiments.

According to embodiments where the slot portion 1012 and the tab portion 1014 may terminate more than one conductive track each, multiple solder portions may be included in the connection 968. In such embodiments, the connection 968 may include the solder portion 1032 and a solder portion 1034. The solder portion 1032 may provide a physical connection between the slot portion 1012 and the tab portion 1014, and the solder portion 1032 may also provide an electrical connection between the conductive track 1022 and the conductive track 1024. The solder portion 1034 may provide a physical connection between the slot portion 1012 and the tab portion 1014, and the solder portion 1034 may also provide an electrical connection between the conductive track 1026 and the conductive track 1028.

Figure 13:
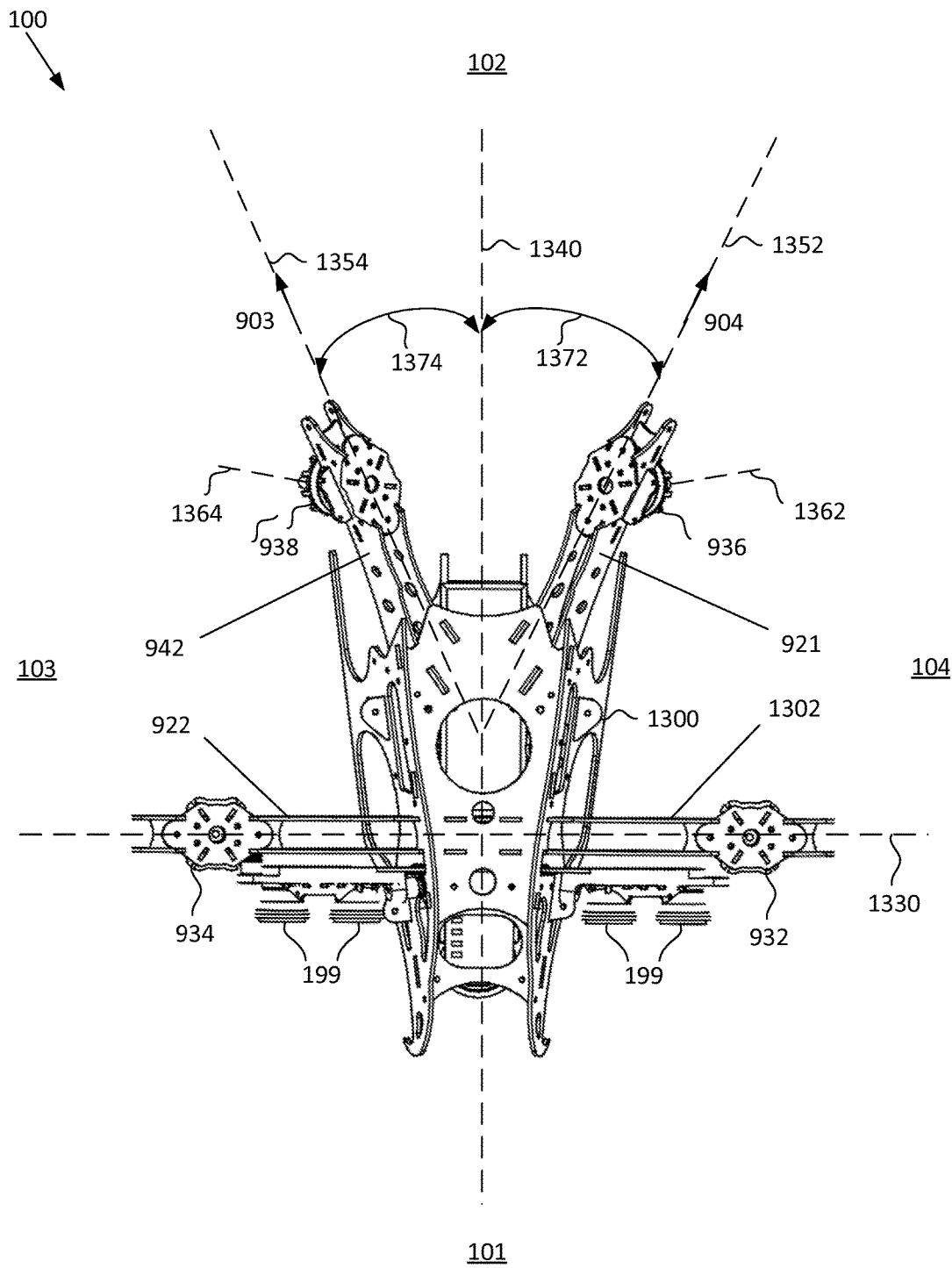
FIG. 13 shows a top view of an unmanned aerial vehicle and various axes according to some embodiments.
Figure 14:
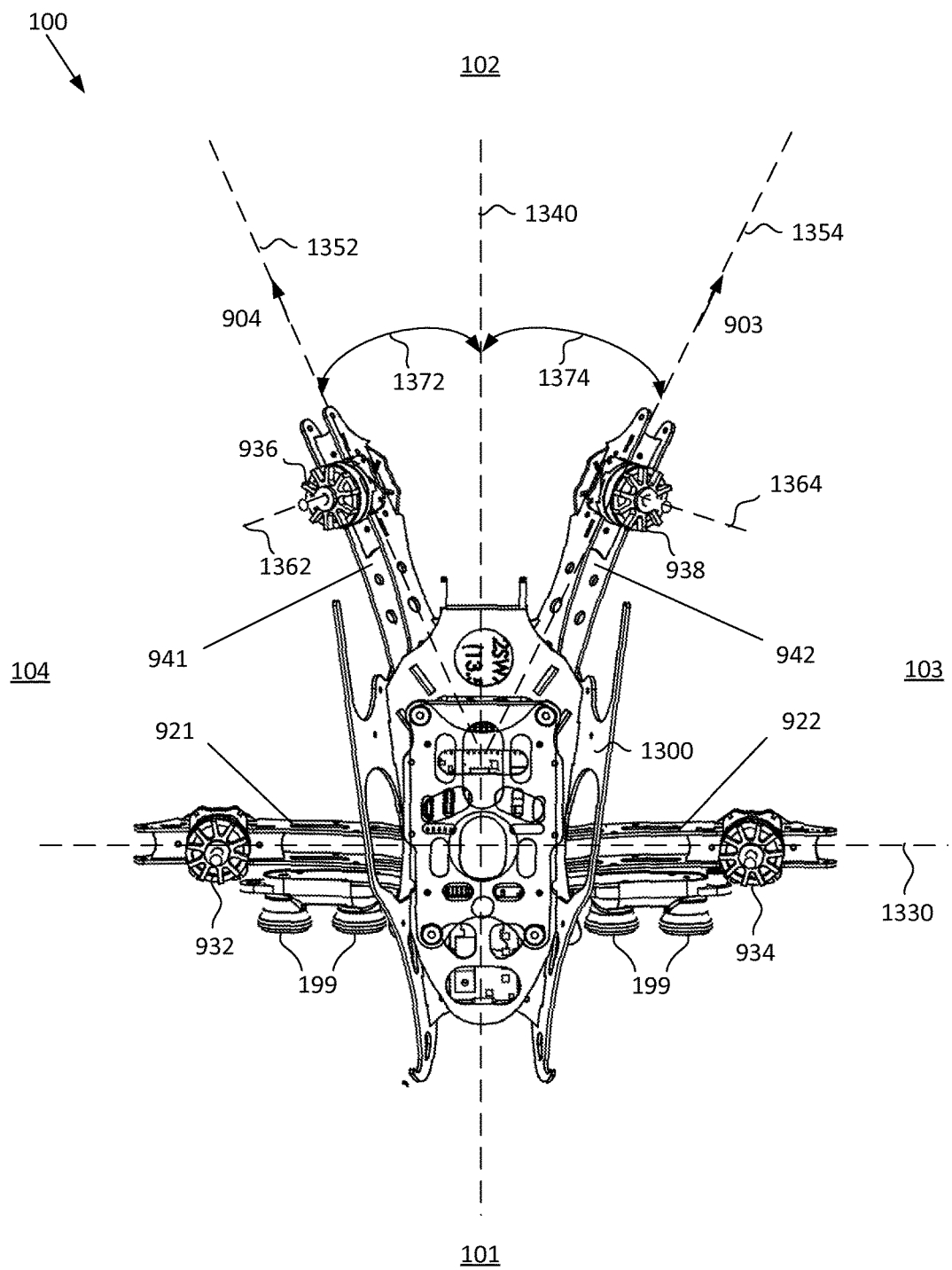
FIG. 14 shows a bottom view of an unmanned aerial vehicle and various axes according to some embodiments.

FIG. 13 shows a top view of the unmanned aerial vehicle 100 and various axes according to some embodiments. FIG. 14 shows a bottom view of the unmanned aerial vehicle 100 and various axes according to some embodiments. With reference to FIGS. 1-14, the unmanned aerial vehicle 100 may contain a central body portion 1300. The central body portion 1300 may be a structure containing various components of the unmanned aerial vehicle 100 (e.g., the processor 802, the memory 804, the power source 812, etc.). In some embodiments, the unmanned aerial vehicle 100 may be configured so that the center of mass of the unmanned aerial vehicle 100 is located within the central body portion 1300.

According to some embodiments, the unmanned aerial vehicle 100 may be situated with respect to a first plane defined by axis 1330 and axis 1340. The first plane defined by the axis 1330 and the axis 1340 may be a horizontal plane. The axis 1330 may pass in the left direction 103 and the right direction 104 across the central body portion 1300 and through each of the arms portions 921 and 922. The axis 1340 may pass in the front direction 101 and the rear direction 102 through the central body portion 1300.

In some embodiments, the front arms 921 and 922 may be provided parallel to the axis 1330. In such configurations, the front-right arm 921 may extend directly out to the right direction 104 (a side direction) from the central body portion 1300, while the front-left arm 922 may extend directly to the left direction 103 (another side direction) from the central body portion 1300. In some embodiments, the aerial propulsion devices 932 and 934 may be provided in a downward facing direction (into the page with respect to FIG. 13). The downward facing direction may be the bottom direction 106. As such, an axis of rotation (1432, 1534 in FIGS. 15-16, respectively) for each of the aerial propulsion device 932 and 934 may be perpendicular to the axis 1330. Similarly, the axis of rotation for each of the aerial propulsion device 932 and 934 may be perpendicular to the axis 1330 if translated either left or right to intersect the axis 1330.

According to some embodiments, the rear arms 941 and 942 may be arranged in a "V" shape. The right-rear arm 941 may be arranged along an axis 1352, and the left-rear arm 942 may be arranged along an axis 1354. The rear arms 941 and 942 may be connected to the central body portion 1300 in a narrow, close, or otherwise more proximate position to one another. The rear arms portions 941 and 942 may be angled outwards as they extend away from the central body portion 1300 to a wide, far, or otherwise less proximate position to one another. As such, the proximal ends (with respect to the central body portion 1300) of the rear arms 941 and 942 may be a first distance apart, whereas the distal ends (with respect to the central body portion 1300) of the rear arms 941 and 942 may be a second distance apart, with the second distance being larger than the first distance. The rear arms 941 and 942 form an acute angle with each other. The rear arms 941 and 942 may be orthogonal with respect to each other.

In some embodiments, the V shape of the rear arms 941 and 942 may be defined based on the position of the rear arms 941 and 942 to the horizontal (first) plane defined by the axes 1330 and 1340. In some embodiments, the axis 1352 on which the right-rear arm 941 is arranged may be positioned at an angle 1372 away from the axis 1340. Similarly, the axis 1354 on which the left-rear arm 942 is arranged may be positioned at an angle 1374 away from the axis 1340. The angle 1372 and the angle 1374 may be provided so as to have the same magnitude as one another, but rotated in different directions with respect to the axis 1340. As such, the axis 1352 and 1354 may be arranged with a same absolute angular separation from the axis 1340, while the axis 1352 is arranged to the right side 104 of the axis 1340 and the axis 1354 is arranged to the left side 103 of the axis 1340.

Numerous configurations of the angles 1372 and 1374 may be provided in various embodiments. In some embodiments, the angles 1372 and 1374 may be provided as greater than zero degrees and less than 90 degrees in absolute values (acute). In this way, the rear arms 941 and 942 may form a "V" shape facing the rear direction 102. In some embodiments, the angles 1372 and 1374 may be provided as between 20 degrees and 30 degrees in absolute values. With the angles 1372 and 1374 provided as between 20 degrees and 30 degrees in absolute values, the rear arms portions 941 and 942 may be swept backwards to a large degree, while still avoiding collision of propellers driven by the aerial propulsion devices 936 and 938. For any configuration where the angles 1372 and 1374 do not equal to zero degrees or 90 degrees (or some multiple thereof), the axes 1352 and 1354 will neither be parallel nor perpendicular to the axis 1340. Similarly, if the axis 1330 is perpendicular to the axis 1340, then the axes 1352 and 1354 will neither be parallel nor perpendicular to the axis 1330.

In some embodiments, the aerial propulsion devices 936 and 938 may be provided in a substantially downward facing direction (a first direction). As such, an axis of rotation 1362 for the aerial propulsion device 936 may be perpendicular to the axis 1352. Similarly, an axis of rotation 1364 for the aerial propulsion device 938 may be perpendicular to the axis 1354. However, each of the axes of rotation 1362 and 1364 may be turned outwards to the side directions. That is, the axis of rotation 1362 may be directed partially in the right direction 104. Similarly, the axis of rotation 1364 may be directed partially in the left direction 103. As a result, the axes of rotation 1362 and 1364 may not be perpendicular to the axis 1340 even if the axes of rotation 1362 and 1364 are translated left or right to intersect the axis 1340.

Numerous configurations of the outward angling of the axes 1362 and 1364 may be provided in various embodiments. In some embodiments, the axes 1362 and 1364 may be angled outwards at angles greater than zero degrees and less than 90 degrees (in absolute values relative to a reference directly downward into the page for FIG. 13). In this way, the axes of rotation 1362 and 1364 may have both components in the top and bottom directions 103, 106 as well as the side directions 103, 104. In particular, the axis of rotation 1362 (a direction in which the aerial propulsion device 936 faces) may be provided so that the aerial propulsion device 936 exerts a force vector with a component force vector in the down direction 106 (for lift) and a component force vector in right direction 104 (for rotation). Similarly, the axis of rotation 1364 (a direction in which the aerial propulsion device 938 faces) may be provided so that the aerial propulsion device 938 exerts a force vector with a component force vector in the down direction 106 (for lift) and a component force vector in left direction 103 (for rotation). At least in this way, the axes of rotation 1362 and 1364 may be provided with outward angling so that the aerial propulsion devices 936 and 938 are configured to provide both lifting force (downward force vectors) and side-to-side force (left/right force vectors). In some embodiments, the axes 1362 and 1364 may be angled outwards at angles between 30 degrees and 40 degrees (in absolute values relative to a reference directly downward into the page for FIG. 13). With such a configuration, the aerial propulsion devices 936 and 938 may be configured to provide both lifting force and side-to-side force, but with slightly stronger force components for lifting force than side-to-side force, because the aerial propulsion devices 936 and 938 may face slightly more downwards than outwards. The outward angling of the axes 1362 and 1364 may be provided differently in various embodiments. The axes 1362 and 1364 coupled with the "V" tail configuration may allow the unmanned aerial vehicle 100 to turn in place while in flight. Alternatively, the configuration may allow turning in a small circle. The sensor devices 199 (e.g., stereo cameras) may be arranged on the front arms 921 and 922 facing the front direction 101. Such arrangement maximizes a field of view of the sensor devices 199 around the unmanned aerial vehicle 100.

Figure 15:
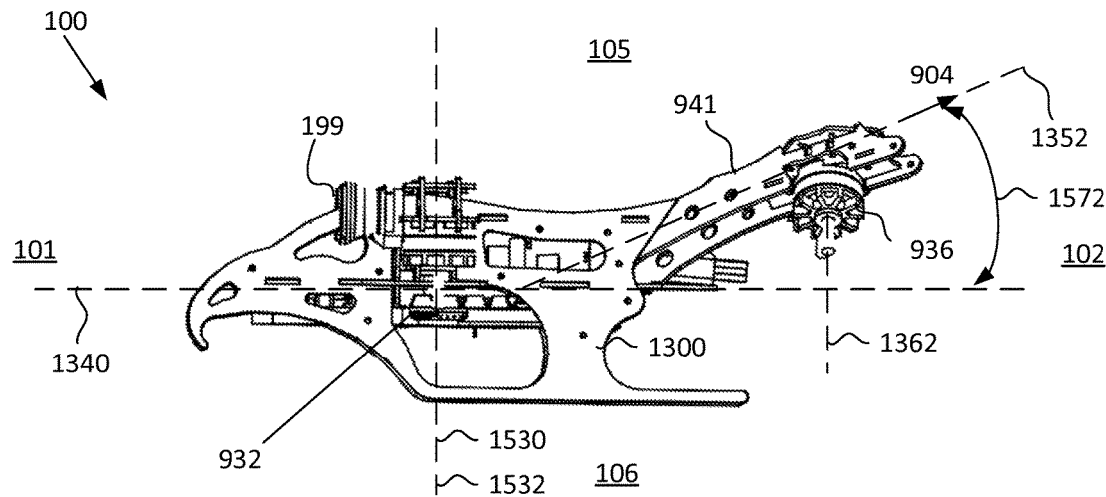
FIG. 15 shows a right side view of an unmanned aerial vehicle and various axes according to some embodiments.
Figure 16:
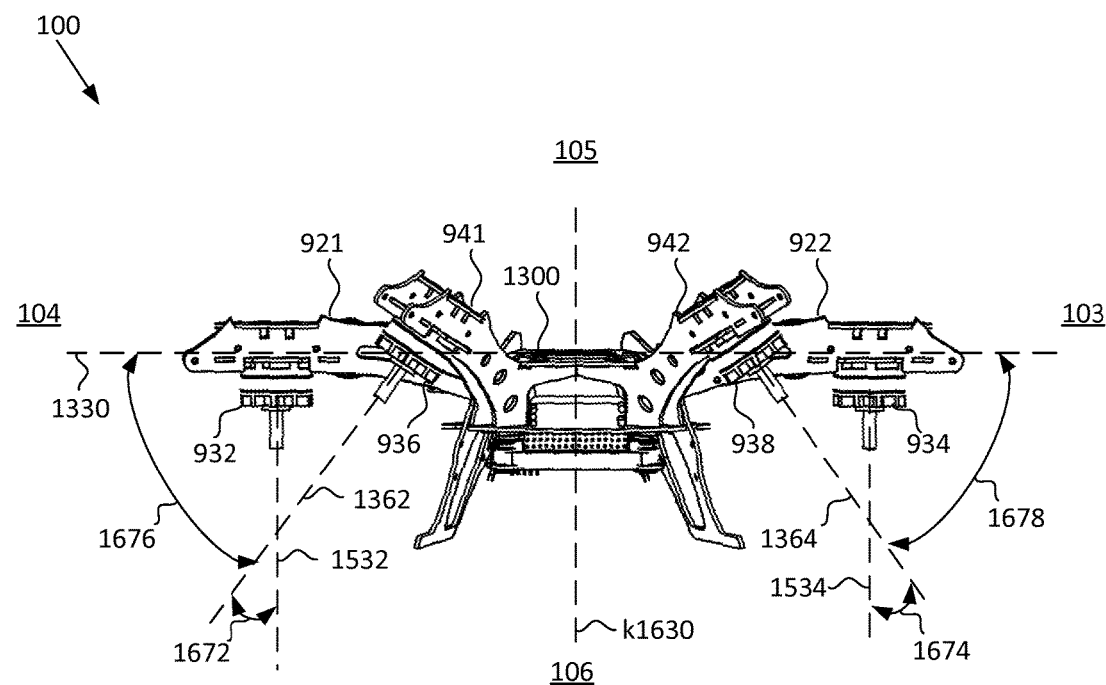
FIG. 16 shows a rear view of an unmanned aerial vehicle and various axes according to some embodiments.

FIG. 15 shows a right side view of the unmanned aerial vehicle 100 and various axes according to some embodiments. FIG. 16 shows a rear view of the unmanned aerial vehicle 100 and various axes according to some embodiments. With reference to FIGS. 1-16, the unmanned aerial vehicle 100 may be situated with respect to axis 1530. The axis 1530 may pass in the up direction 105 and the down direction 106 through the central body portion 1300.

According to some embodiments, the aerial propulsion devices 932 and 934 may be configured so as to rotate around axes of rotation 1532 and 1534, respectively. In particular, the aerial propulsion device 932 may rotate about the axis of rotation 1532. Similarly, the aerial propulsion device 934 may rotate about the axis of rotation 1534. The axes of rotation 1532 and 1534 may be provided perpendicular to the axis 1330. Similarly, the axes of rotation 1532 and 1534 may be provided perpendicular to the axis 1330 if translated either left or right to intersect the axis 1330. The axes of rotation 1532 and 1534 may be provided parallel to the axis 1530. As such, the aerial propulsion devices 932 and 934 may be configured to generate force vectors with components only in the down direction 106. Therefore, the aerial propulsion devices 932 and 934 may provide only a lifting force as a direct force on the surrounding environment. Nonetheless, when the unmanned aerial vehicle 100 is not situated flat on the horizontal plane, the force from the aerial propulsion devices 932 and 934 may provide components in other directions other than only the down direction 106.

According to some embodiments, the outward angling of the axes of rotation 1362 and 1364 may be defined by the angles 1672, 1674, 1676, and 1678. As discussed, the aerial propulsion devices 936 and 938 may be provided as angled outwards relative to an up-down axis (e.g., the axis 1530). The angle 1672 defines the angular difference between the axis of rotation 1362 (of the aerial propulsion device 936) and the axis of rotation 1532 (of the aerial propulsion device 932). The angle 1672 may be provided as discussed. In some embodiments, the angle 1672 may be provided greater than zero degrees and less than 90 degrees (in absolute values). In some embodiments, the angle 1672 may be provided between 30 degrees and 40 degrees (in absolute values). The angle 1676 is the complement of the angle 1672. The angle 1674 defines the angular difference between the axis of rotation 1364 (of the aerial propulsion device 938) and the axis of rotation 1534 (of the aerial propulsion device 934). The angle 1674 may be provided as discussed. In some embodiments, the angle 1674 may be provided greater than zero degrees and less than 90 degrees (in absolute values). In some embodiments, the angle 1674 may be provided between 30 degrees and 40 degrees (in absolute values). The angle 1678 is the complement of the angle 1674.

In some embodiments, the angles 1672 and 1674 may provide a benefit of allowing a more compact placement of the rear arms 941 and 942. In particular, if the axes of rotation 1362 and 1364 were provided directly vertical (i.e., parallel to the axis 1530) and the angles 1672 and 1674 were equal to zero, then the propellers driven by the aerial propulsion devices 936 and 938 may be more likely to collide due to rotation on a same horizontal plane. However, with the angles 1672 and 1674 provided greater than zero, the propellers driven by the aerial propulsion devices 936 and 938 do not rotate on a same plane. While the planes of rotation may intersect, the planes of rotation may intersect less often than would occur if the angles 1672 and 1674 were provided equal to zero. As such, because the angles 1672 and 1674 greater than zero reduce the collision space of propellers driven by the aerial propulsion devices 932 and 934, the aerial propulsion devices 932 and 934 (and by consequence the rear arms 941 and 942) may be placed in closer proximity. Stated in other terms, the use of non-zero angles for the angles 1672 and 1674 allow the use of smaller angles for the angles 1372 and 1374. As discussed, the angles 1372 and 1374 may allow a composite angular separation of the rear arms 941 and 942 of 40 degrees (i.e., 20 degree configurations for each of 1372 and 1374). Without the use of the outward angles 1372 and 1374, the minimum composite angular separation of the rear arms 941 and 942 may be much greater than 40 degrees.

According to some embodiments, the rear arms 941 and 942 may be provided at angular separations relative to the axis 1340. In some embodiments, the rear arm 941 may be provided on the axis 1353 at an angle 1572 relative to the axis 1340. In some embodiments, the angle 1572 may be provided greater than zero degrees and less than 90 degrees (in absolute values). In some embodiments, the angle 1572 may be provided between 20 degrees and 30 degrees (in absolute values).

In some embodiments, the angle 1572 may not cause the axis of rotation 1362 to be directed in the rear direction 102. In such embodiments, even though the angle 1572 causes the rear arm 941 to be positioned in the up direction 105 from the axis 1340, the rear arm 941 may compensate for the angle 1572 so that the axis of rotation 1362 is directed strictly in an up and down direction (i.e., parallel to the axis 1530).

In some embodiments, the angle 1572 may cause the axis of rotation 1362 to be directed in the rear direction 102. In such embodiments, the axis of rotation 1362 may be provided perpendicular to the axis 1352. As such, the axis of rotation 1362 may be provided relative to perfectly vertical (i.e., a translation of the axis 1530) at an angle that is the complement of the angle 1572. This may be the case based on the right triangle defined by the right angle at the intersection of the axis 1352 and the axis of rotation 1362, the angle 1572, and the angle of rearward deflection for the angle of rotation 1362. In embodiments where the axis of rotation 1362 is directed in the rear direction 102, the aerial propulsion device 936 may generate a force vector with a rearward force component in addition to the lifting force component and side-to-side force component discussed.

The distal ends (e.g., the aerial propulsion devices 936 and 938) of the rear arms 941 and 942 may be elevated in the top direction 105 with respect to the aerial propulsion devices 932 and 934 and the front arms 941 and 942. The aerial propulsion devices 932, 934, 936, and 938 may be each provided below (in the bottom direction 106) the distal end of the respective one of the arms 921, 922, 941, and 942.

The configurations described with respect to FIGS. 1-16 may provide numerous benefits in various embodiments. The unmanned aerial vehicle 100 may allow simplified controller design, improved maneuverability, improved sensor operation, and safer operation in addition to other benefits.

In some embodiments, the unmanned aerial vehicle 100 may allow simplified controller design due to the arrangement of the aerial propulsion devices 932, 934, 936 and 938. First, because the aerial propulsion devices 936 and 938 may be configured to provide force vector components in multiple directions simultaneously (e.g., lifting force vector and side-to-side force vector), the unmanned aerial vehicle 100 may be able to perform maneuvers using the direct force vectors from the aerial propulsion device 936 and 938 in addition to using the angular velocity differentials of the aerial propulsion devices 932, 934, 936 and 938 as used in standard quadcopter devices. With the use of direct force components in multiple directions from the aerial propulsion devices 936 and 938, the unmanned aerial vehicles 100 may be able to perform maneuvers without the use of angular velocity differentials or with less sensitivity required in the control of angular velocities of the aerial propulsion devices 932, 934, 936 and 938 when using angular velocity differentials.

In some embodiments, the unmanned aerial vehicle 100 may be configured to use only the aerial propulsion device 936 and 938 to provide rotational force. In such embodiments, the aerial propulsion devices 932 and 934 may only be used to provide the single direction force vector along the axis of rotation 1532. As such, the controller may need to provide significantly fewer or less frequent control signals to the aerial propulsion devices 936 and 938. This may allow a simplified controller design including reduced controller logic.

In some embodiments, the unmanned aerial vehicle 100 may allow improved maneuverability due to the arrangement of the aerial propulsion devices 932, 934, 936 and 938. As discussed, the arrangement of the aerial propulsion devices 936 and 938 may produce force vectors with multiple force vectors of lifting force, side-to-side force, and/or rearward force. In addition, the unmanned aerial vehicle 100 may use angular velocity differentials to create angular velocity for the unmanned aerial vehicle as used in standard quadcopter devices. Therefore, the unmanned aerial vehicle 100 may be able to perform more maneuvers and more rapid maneuvers due to these additional force vectors, which may not be possible with standard quadcopter devices. Furthermore, the unmanned aerial vehicle 100 may rotate in place or in a small circle.

In some embodiments, the unmanned aerial vehicle 100 may be capable of improved sensor operation due to the arrangement of the aerial propulsion devices 932, 934, 936 and 938. In particular, the unmanned aerial vehicle 100 may be capable of operating sensors (e.g., sensor devices 199) more effectively due to the numerous force vectors produced by the aerial propulsion devices 932, 934, 936 and 938. In some situations, the use of the sensor devices 199 (e.g., stereo cameras) may be complicated based on translational movement of the unmanned aerial vehicle 100. The sensor devices 199 (which may correspond to the sensors 810) or other devices (e.g., the processor 802) may need to determine the precise movement of the unmanned aerial vehicle 100 in order to determine the field being sensed at any particular time by the sensor devices 199. Velocity sensing components provided on the unmanned aerial vehicle 100 (e.g., an inertial measurement unit) may be highly effective at measuring angular changes in the position of the unmanned aerial vehicle 100. However, these velocity sensing components may not be as effective at measuring translational changes in the position of the unmanned aerial vehicle (e.g., movement in any of the directions 101-106). Because the aerial propulsion devices 932, 934, 936 and 938 may be capable of producing force vector components in multiple directions simultaneously, the unmanned aerial vehicle 100 may be configured to perform rotational movement without significant translational movement. For example, the unmanned aerial vehicle 100 may be capable of rotating about a point defined by the intersection of the axes 1340 and 1530 with little or no movement in any of the directions 101, 102, 105, or 106. This form of "rotation-in-place" may not be capable with standard quadcopter devices due to the limitation that force vectors are all provided in a single direction. As such, the unmanned aerial vehicle 100 may be capable of performing sensing with the sensor devices 199 while reducing the imprecise translation movement that would otherwise make interpretation of the sensor output more difficult.

In some embodiments, the unmanned aerial vehicle 100 may be capable of safer operation due to the arrangement of the aerial propulsion devices 932, 934, 936 and 938. Because the aerial propulsion devices 936 and 938 may be configured to produce force vector components in numerous directions outward from the unmanned aerial vehicle 100, the unmanned aerial vehicle 100 may be less likely to collide with objects in a surrounding environment. In particular, because a standard quadcopter device only produces force vectors in a single direction (nominally downward when flat on a horizontal plane), the standard quadcopter device may be prone to drifting into and colliding with objects positioned in numerous directions around the standard quadcopter device (e.g., to the side of the device). However, the unmanned aerial vehicle 100 may be configured to produce force vector components in downwards, side-to-side, and/or rearwards directions simultaneously. As such, the unmanned aerial vehicle 100 may be more likely to push away from objects positioned in numerous directions around the unmanned aerial vehicle 100 (e.g., to the side of the unmanned aerial vehicle 100). As a result, the unmanned aerial vehicle may be capable of operation with fewer or less significant collisions with objects in the surrounding environment.

Figure 17:
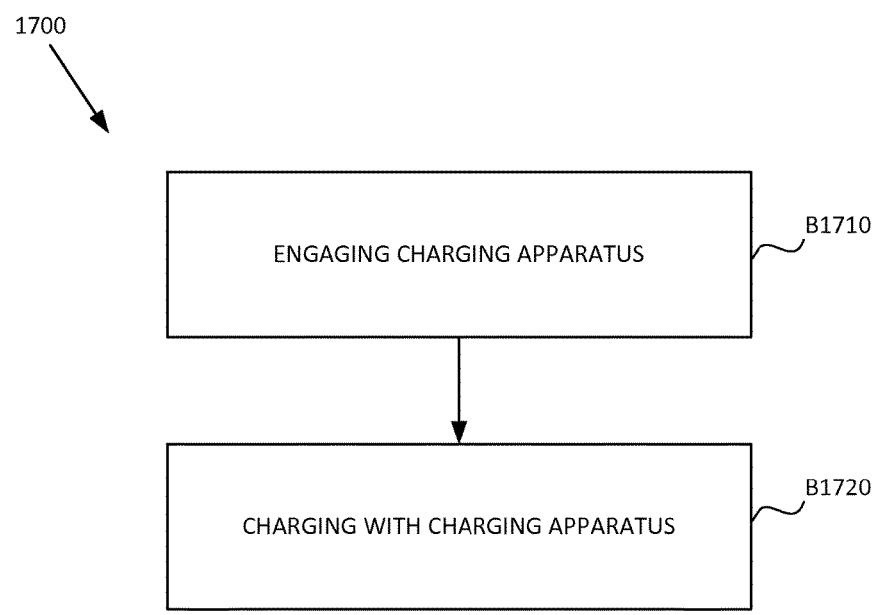
FIG. 17 shows a flow diagram of a general method for charging the unmanned aerial vehicle according to various embodiments.

FIG. 17 shows a flow diagram of a general method 1700 for charging the unmanned aerial vehicle 100 according to various embodiments. With reference to FIGS. 1-17, the method 1700 may be used for embodiments where a charging apparatus may be available to charge energy storage devices (e.g., batteries or capacitors) of the unmanned aerial vehicle 100.

The charging apparatus may be a device fixed to a position close to the ground or elevated in the air above the ground. In other embodiments, the charging apparatus may be secured to a moving or movable object, such as, but not limited to a train, a plane, a boat, another drone, an automobile, a truck or other vehicle. The charging apparatus may include at least a power source, engagement device, and transfer unit. The power source may be any suitable power source containing power to be transferred to the unmanned aerial vehicle 100. The engagement device may be any suitable device for engaging the unmanned aerial vehicle 100 (in particular, a charging engagement element of the unmanned aerial vehicle 100 as described). The engagement device may be a wire, a rod, a clutch, a clamp, a net, a hook, a combination thereof, and/or the like. The transfer unit may be any suitable device for wireless (e.g., inductive) or wired transfer of power stored in the power source to the energy storage devices of the unmanned aerial vehicle 100. Examples of the transfer unit may include, but not limited to, a wire, inductive charging unit, coils, a combination thereof, and/or the like.

First at block B1710, the unmanned aerial vehicle 100 may engage the charging apparatus. For example, the charging engagement element of the unmanned aerial vehicle 100 may be mechanically or electromagnetically become coupled, linked, or connected to the engagement device of the charging apparatus. As such, the unmanned aerial vehicle 100 may become linked physically to the charging apparatus to allow charging of the unmanned aerial vehicle 100.

Next at block B1720, the unmanned aerial vehicle 100 may be charged by the charging apparatus. The charging may be any suitable wireless (e.g., inductive) or wires charging by the transfer unit of the charging apparatus. In particular embodiments, the manner of charging may be depending on the configuration (e.g., position and orientation) of the unmanned aerial vehicle 100 as it becomes engaged with the charging apparatus at the engagement device of the charging apparatus.

Figure 18A:
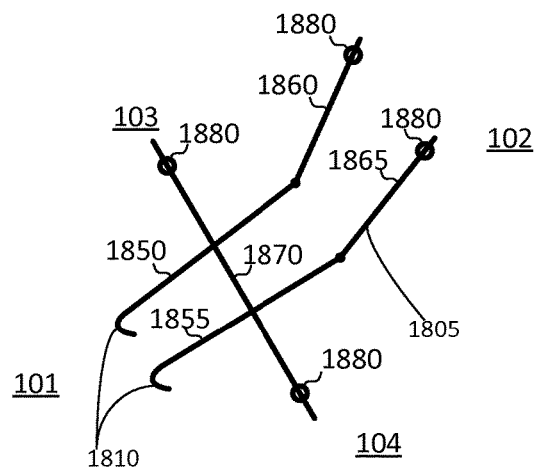
FIG. 18A is a conceptual diagram in perspective views of the unmanned aerial vehicle according to various embodiments.
Figure 19:
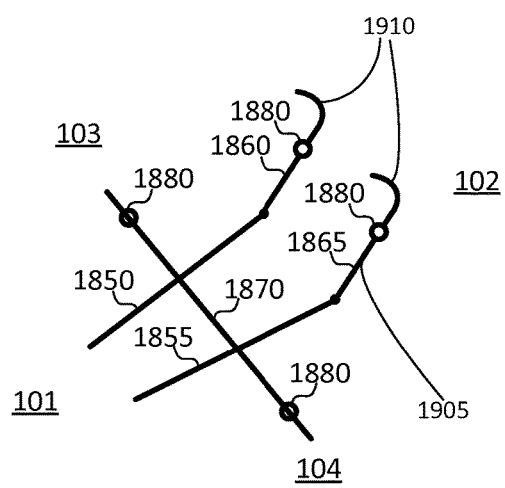
FIG. 19 is a conceptual diagram in perspective views of the unmanned aerial vehicle according to various embodiments.
Figure 20:
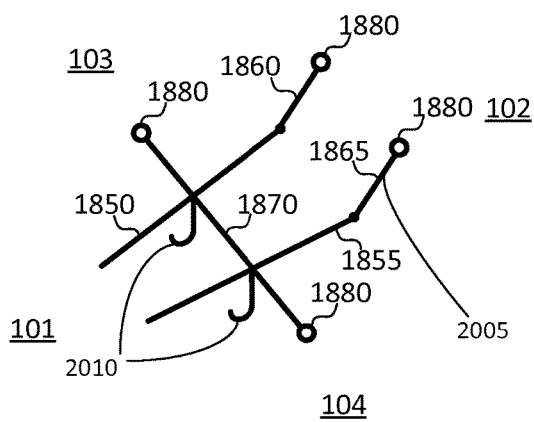
FIG. 20 is a conceptual diagram in perspective views of the unmanned aerial vehicle according to various embodiments.

FIGS. 18A, 19, and 20 are conceptual diagrams in perspective views of the unmanned aerial vehicle 100 according to various embodiments. In particular, FIGS. 18A, 19, and 20 are diagrams illustrating positions of the charging engagement element of the unmanned aerial vehicle 100 according to corresponding embodiments. One of ordinary skill in the art would appreciate that, while two hooks may be shown in the non-limiting examples shown herein, one, three, or more hooks (or other suitable charging engagement elements) may be provided to the unmanned aerial vehicle 100.

Figure 18B:
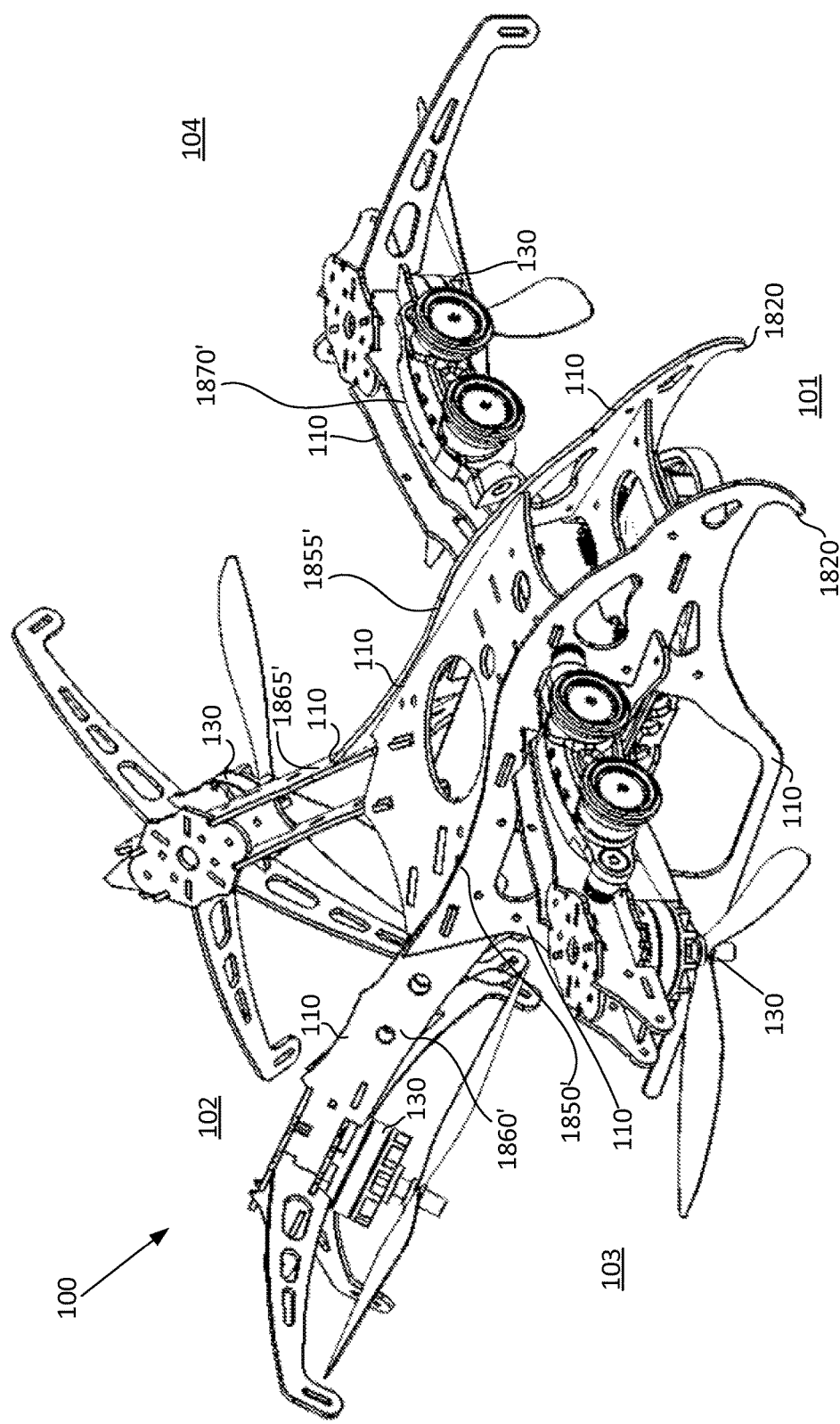
FIG. 18B is a perspective view of the unmanned aerial vehicle in various embodiments.

The portions of the conceptual diagrams may correspond to components of the unmanned aerial vehicle 100 (a perspective view of which may be illustrated in FIG. 18B). For example, a first representative line 1850 may correspond to a first axial dimension 2450'. A second representative line 1855 may correspond to a second axial dimension 2455'. A third representative line 1860 may correspond to a first tail axial dimension 2460'. A fourth representative line 1865 may correspond to a second tail axial dimension 2460'. A fifth representative line 1870 may correspond to a cross dimension 1870'. And representative motors 1880 may correspond to the aerial propulsion devices 130.

In particular, FIG. 18A illustrates embodiments where the charging engagement element includes two front hook members 1810 provided at a front portion of the unmanned aerial vehicle 100 (as illustrated in a first simplified model 1805). Referring to FIGS. 1-18A, the front hook members 1810 may be a portion of the frame 110 of the unmanned aerial vehicle 100 made of the same material and having the same physical properties as the frame 110. In other embodiments, the front hook members 1810 may be connected to or linked to the frame 110. The front hook members 1810 may be provided in the front direction 101 as compared to the rest of the unmanned aerial vehicle 100 or the rest of the frame 110. In other words, the front hook members 1810 may be provided at a front portion of the unmanned aerial vehicle 100. The front portion is arranged in the front direction 101 as compared to the rest of the unmanned aerial vehicle 100 and the frame 110.

In the non-limiting example shown in FIG. 18A, base portions of the front hook members 1810 may extend from (the front portion of) the frame 110 of the unmanned aerial vehicle 100 in the front direction 101. End (tip) portions of the front hook members 1810 may be curved with respect to the base portion and pointing at a different direction than the front direction 101. For example, the end portion of each of the front hook members 1810 may be curved toward the bottom direction 106, the rear direction 102, a combination thereof, and/or the like. In some examples, the front hook members 1810 may curve in the top direction 105, the rear direction 102, a combination thereof, and/or the like. In some examples, each of the front hook members 1810 may curve, in the left direction 103 or the right direction 104 (in addition to any other directional component of curvature).

FIG. 18B is a perspective view of the unmanned aerial vehicle 100 in various embodiments. The unmanned aerial vehicle 100 may include two hook members 1820 as the charging engagement element of the unmanned aerial vehicle 100. The hook members 1820 may correspond to the front hook members 1810. The front hook members 1820 may be a portion of the frame 110. The hook members 1820 may be made of the same materials as the frame 110 and/or have the same physical properties as the frame 110. In particular, the hook members 1820 may have the same conductive properties as the frame 110. In the non-limiting example shown in FIG. 18B, (an end portion of) each of the hook members 1820 may be curved in a direction having vector components in the rear direction 102 and the bottom direction 106. In addition, (the end portion of) each of the hook members 1820 may be curved in a direction having vector components in either the right direction 103 or the left direction 104.

FIG. 19 illustrates embodiments where the charging engagement element includes two rear hook members 1910 provided at a rear portion of the unmanned aerial vehicle 100 (as illustrated in a second simplified model 1905). Referring to FIGS. 1-19, the rear hook members 1910 may be a portion of the frame 110 of the unmanned aerial vehicle 100 made of the same material and having the same physical properties as the frame 110. In other embodiments, the rear hook members 1910 may be connected to or linked to the frame 110. The rear hook members 1910 may be provided in the rear direction 102 as compared to the rest of the unmanned aerial vehicle 100 or the frame 110. In other words, the rear hook members 1910 may be provided at a rear portion of the unmanned aerial vehicle 100. The rear portion (tip of the V-shaped tails) is arranged in the rear direction 102 as compared to the rest of the unmanned aerial vehicle 100 and the frame 110.

In the non-limiting example shown in FIG. 19, base portions of the rear hook members 1910 may extend from (the rear portion of) the frame 110 of the unmanned aerial vehicle 100 in the rear direction 102 and/or the top direction 105. End (tip) portions of the rear hook members 1910 may be curved with respect to the base portion and pointing at a different direction than the rear direction 102 and/or the top direction 105. For example, the end portion of each of the rear hook members 1910 may be curved in the front direction 101, the bottom direction 106, a combination thereof, and/or the like. In some examples, the rear hook members 1910 may curve in the top direction 105, the rear direction 102, a combination thereof, and/or the like. In some examples, each of the rear hook members 1910 may curve, in the left direction 103 or the right direction 104 (in addition to any other directional component of curvature).

FIG. 20 illustrates embodiments where the charging engagement element includes two bottom hook members 2010 provided at a bottom portion of the unmanned aerial vehicle 100 (as illustrated in a third simplified model 2005). Referring to FIGS. 1-20, the bottom hook members 2010 may be a portion of the frame 110 of the unmanned aerial vehicle 100 made of the same material and having the same physical properties as the frame 110. In other embodiments, the bottom hook members 2010 may be connected to or linked to the frame 110. The bottom hook members 2010 may be provided in the bottom direction 106 as compared to the rest of the unmanned aerial vehicle 100 or the frame 110. In other words, the bottom hook members 2010 may be provided at a bottom portion (e.g., a slide portion or a payload interface) of the unmanned aerial vehicle 100. The bottom portion may be arranged in the bottom direction 106 as compared to the rest of the unmanned aerial vehicle 100 and the frame 110.

In the non-limiting example shown in FIG. 20, base portions of the bottom hook members 2010 may extend from (the bottom portion of) the frame 110 of the unmanned aerial vehicle 100 in the bottom direction 106. End (tip) portions of the bottom hook members 2010 may be curved with respect to the base portion and pointing at a different direction than the bottom direction 106. For example, the end portion of each of the bottom hook members 2010 may be curved in the front direction 101, the top direction 105, a combination thereof, and/or the like. In some examples, the bottom hook members 2010 may curve in the top direction 105, the rear direction 102, a combination thereof, and/or the like. In some examples, each of the bottom hook members 2010 may curve, in the left direction 103 or the right direction 104 (in addition to any other directional component of curvature).

In various embodiments, two or more charging engagement elements (e.g., the front hook members 1810, the hook members 1820, the rear hook members 1910, the bottom hook members 2010, and/or the like) may be provided to allow the unmanned aerial vehicle 100 to be charged in various configurations. Thus, flexibility of charging the unmanned aerial vehicle 100 may accordingly be achieved.

Figure 21A:
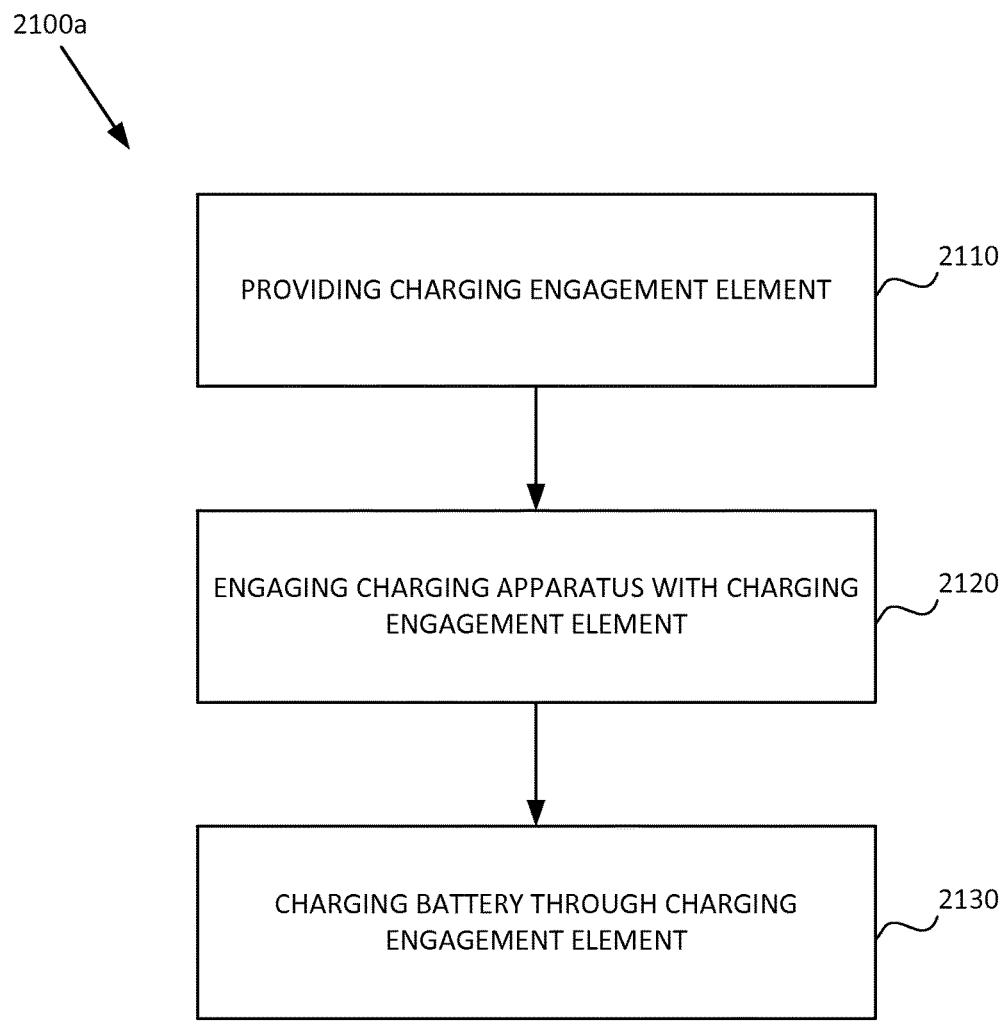
FIG. 21A shows a flow diagram of a method for charging the unmanned aerial vehicle according to various embodiments.

FIG. 21A shows a flow diagram of a method 2100a for charging the unmanned aerial vehicle 100 according to various embodiments. With reference to FIGS. 1-21A, the method 2100a may be used for embodiments where the charging engagement element of the unmanned aerial vehicle 100 may be used as a charging device of the unmanned aerial vehicle 100. As used herein, a charging device may be a device on the unmanned aerial vehicle 100 that receives power (stored in the power source of the charging apparatus) from the transfer unit of the charging apparatus and relay the power to the energy storage devices of the unmanned aerial vehicle 100. In such embodiments, the engagement device in the charging apparatus may also be implemented as the transfer unit. Thus, charging may be completed by coupling of only the engagement device of the charging apparatus and the charging engagement element of the unmanned aerial vehicle 100.

First at block B2110, a charging engagement element may be provided to the unmanned aerial vehicle 100. For example, the charging engagement element may be suitable hooks (e.g., the front hook members 1810, the hook members 1820, the rear hook members 1910, and the bottom hook members 2010) as described. Two or more charging engagement elements may be provided to allow flexibility in charging methods.

Next at block B2120, the unmanned aerial vehicle 100 may engage (the engagement device) of the charging apparatus with the charging engagement element. In various embodiments, the engagement device may be at least one of a wire, a clutch, a net, a hook, a combination thereof, and/or the like. The charging engagement element may become connected, linked, hooked, clutched, captured, or otherwise contacted by at least a portion of the engagement device of the charging apparatus. In the non-limiting examples described herein, the engagement device may be a strip of wire, and the charging engagement element may be hooks. The hooks may be engaged to the wire by hooking onto the wire as described in further detail herein.

Next at block B2130, the unmanned aerial vehicle 100 may charge its batteries/capacitors (i.e., energy storage devices) through the charging engagement element of the unmanned aerial vehicle 100. In the non-limiting examples provided, the wire, which is the engagement device, may also be the transfer unit used to transfer power from the power source of the charging device to the unmanned aerial vehicle 100. The hooks may also be implemented as both the charging engagement element and the charging device. In other words, the hooks may physically position the unmanned aerial vehicle 100 in a charging position and receive power from the transfer unit of the charging apparatus. The power may be transferred from the power source, through the wire to the hooks; the hooks may, in turn, relay the power to the energy storage devices of the unmanned aerial vehicle 100.

In some embodiments, the hooks (charging engagement element) of the unmanned aerial vehicle 100 is connected to the rest of the frame 110 and share material properties such as conductivity. The hooks may also server as the charging device in transferring power from the transfer unit of the charging apparatus to the energy storage of the unmanned aerial vehicle 100. Thus, the hooks may use the frame 110 as conduits for transferring power to the energy storage. Components provided on the frame 110 that are not a part of the transfer conduit may be accordingly insulated.

Figure 21B:
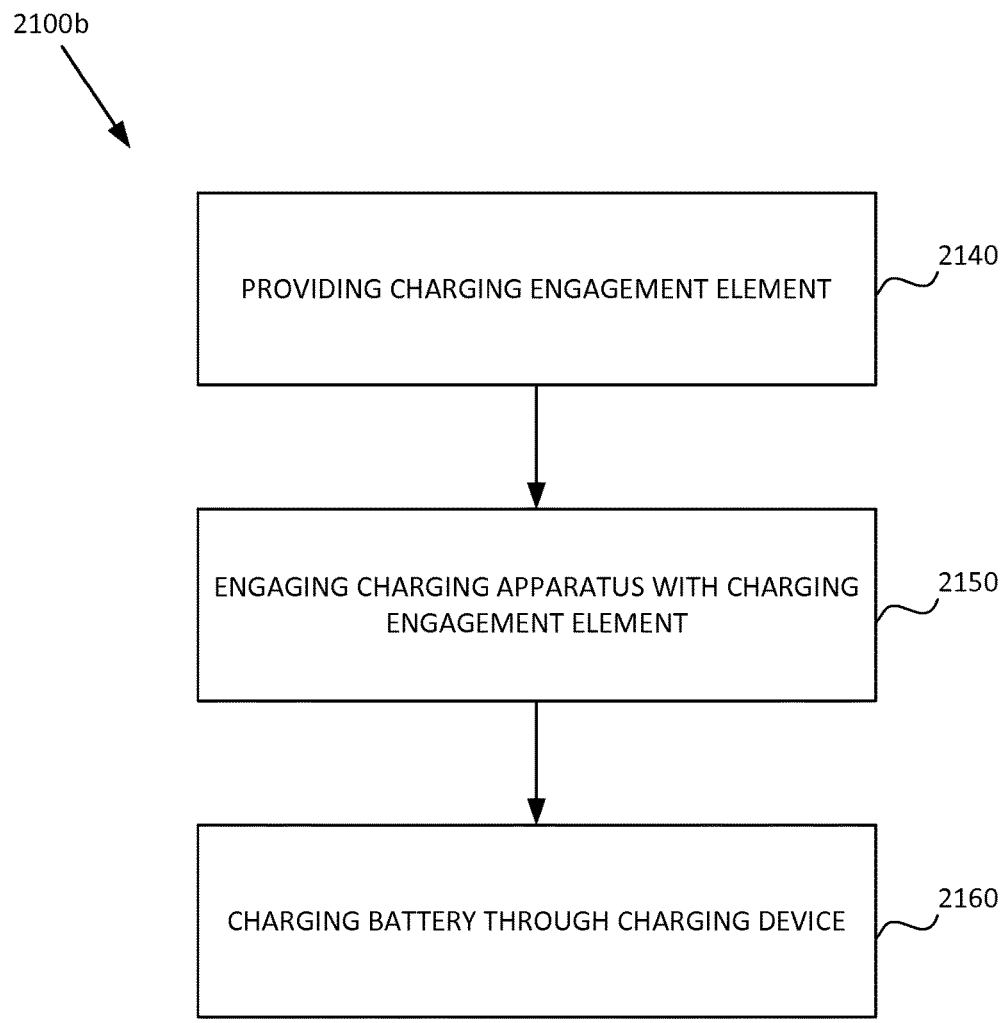
FIG. 21B shows a flow diagram of a method for charging the unmanned aerial vehicle according to various embodiments.

FIG. 21B shows a flow diagram of a method 2100b for charging the unmanned aerial vehicle 100 according to various embodiments. With reference to FIGS. 1-21B, the method 2100b may be used for embodiments where the charging engagement element of the unmanned aerial vehicle 100 may be a separate device (portion of the unmanned aerial vehicle 100) as the charging device of the unmanned aerial vehicle 100. In such embodiments, the engagement device in the charging apparatus may a separate device as the transfer unit. Thus, charging may be completed by coupling of the transfer unit and the charging device. The engagement device of the charging apparatus and the charging engagement element of the unmanned aerial vehicle 100 may be implemented to position or orient the unmanned aerial vehicle 100 in an appropriate position such that the transfer unit and the charging device may be in contact (for wired or wireless charging) or within a desired proximity (for wireless charging).

First at block B2140, the charging engagement element may be provided to the unmanned aerial vehicle 100. For example, the charging engagement element may be suitable hooks (e.g., the front hook members 1810, the hook members 1820, the rear hook members 1910, and the bottom hook members 2010) as described. Two or more charging engagement elements may be provided to allow flexibility in charging methods.

Next at block B2150, the unmanned aerial vehicle 100 may engage (the engagement device) of the charging apparatus with the charging engagement element. In various embodiments, the engagement device may be at least one of a wire, a clutch, a net, a hook, a combination thereof, and/or the like. The charging engagement element may become connected, linked, hooked, clutched, captured, or otherwise contacted by at least a portion of the engagement device of the charging apparatus. In the non-limiting examples described herein, the engagement device may be a strip of wire, and the charging engagement element may be hooks as described. The hooks may be engaged to the wire by hooking onto the wire.

Next at block B2160, the unmanned aerial vehicle 100 may charge its batteries/capacitors (i.e., energy storage devices) through the charging device of the unmanned aerial vehicle 100. For example, the hooks and the wire may position the unmanned aerial vehicle 100 in a suitable charging position such that the transfer unit of the charging apparatus may transfer power to the charging device in any suitable wired or wireless fashion. Given that the engagement device and the transfer unit may be different devices, the engagement device and the transfer unit may be located at different portions of the charging apparatus. Similarly, given that the charging engagement element and the charging device may be different devices, the charging engagement element and the charging device may be located at different portions of the unmanned aerial vehicle 100.

Figure 22:
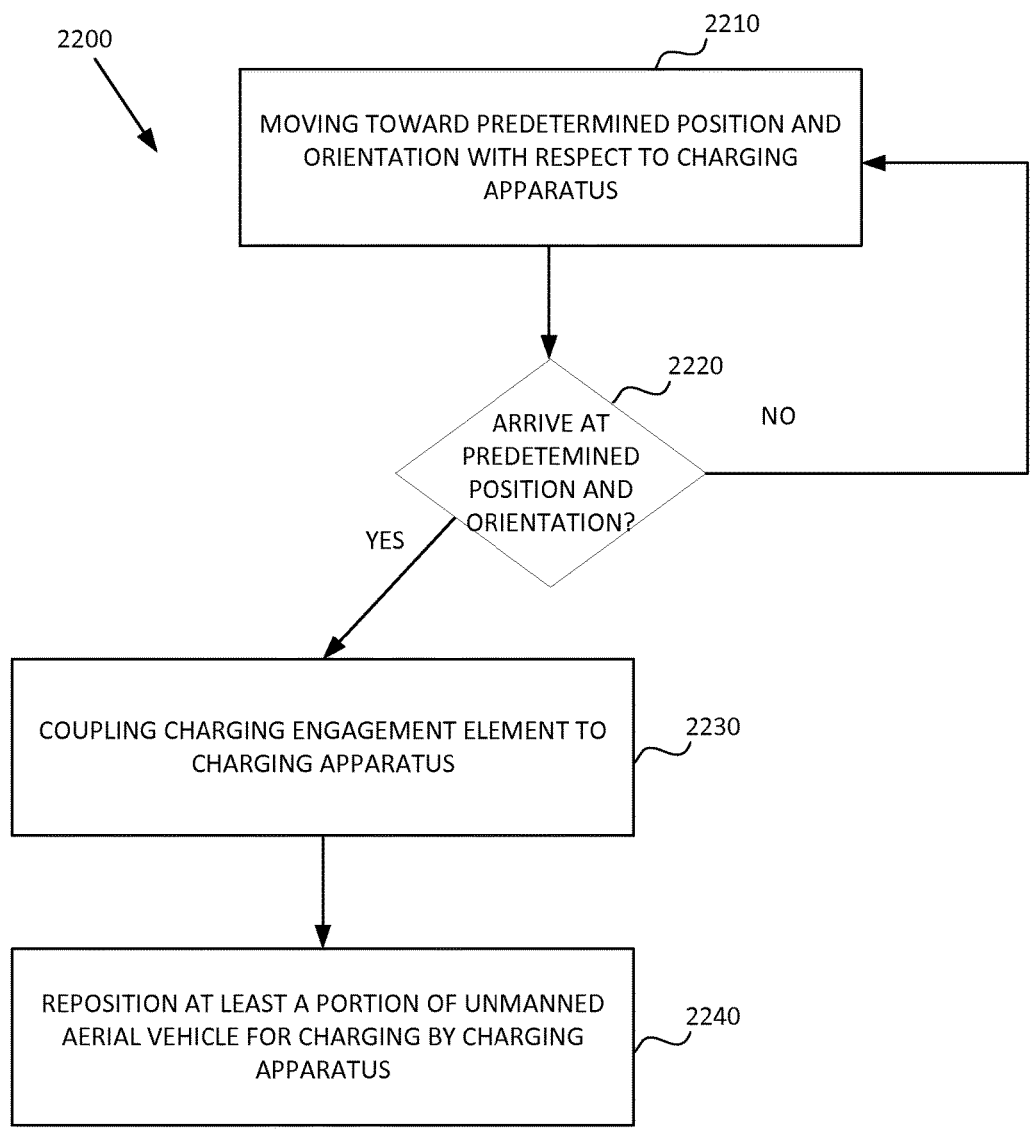
FIG. 22 shows a flow diagram of a method for positioning the unmanned aerial vehicle for charging according to various embodiments.

FIG. 22 shows a flow diagram of a method 2200 for positioning the unmanned aerial vehicle 100 for charging according to various embodiments. With reference to FIGS. 1-22, the method 2200 may correspond to blocks B1710, B2120, and B2220. At block B2210, the unmanned aerial vehicle 100 may move toward a predetermine position and orientation with respect to the charging apparatus.

For example, a predetermined position may be one or a range of positions that the unmanned aerial vehicle 100 may be in prior to the coupling process of the charging engagement element of the unmanned aerial vehicle 100 and the engagement device of the charging apparatus. The predetermined orientation may be one or a range of orientations (e.g., angle) that the unmanned aerial vehicle 100 may be in prior to the coupling process of the charging engagement element of the unmanned aerial vehicle 100 and the engagement device of the charging apparatus.

In some embodiments, the unmanned aerial vehicle 100 may move to the predetermined position and orientation based on user controls by an operator of the unmanned aerial vehicle 100. In other embodiments, the unmanned aerial vehicle 100 may move to the predetermined position and orientation automatically based on sensor information received from the sensors 810. The processor 802 may accordingly calculate movement s of the unmanned aerial vehicle 100 needed to arrive at the predetermined position and orientation and cause the unmanned aerial vehicle 100 to do so.

Next at block B2220, it may be determined whether the unmanned aerial vehicle 100 has arrived at the predetermined position and orientation. In some embodiments, such determination may be made manually by the operator. In other embodiments, the processor 802 may make such determination based on information detected by the sensors 810. Whereas it has been determined that the unmanned aerial vehicle 100 has not arrived at the predetermined position or orientation, the unmanned aerial vehicle 100 may be configured to move toward the predetermined position and orientation, for example, at block B2210 (B2220: NO).

On the other hand, whereas it has been determined that the unmanned aerial vehicle 100 has arrived at the predetermined position and/or orientation, the unmanned aerial vehicle 100 may couple the charging engagement element to the (engagement device) of the charging apparatus at block B2230 (B2220: YES). In the non-limiting examples described herein, coupling may include allowing at least a portion of the hooks of the unmanned aerial vehicle 100 to come into contact with the wire of the charging device. In other examples, the engagement device of the charging apparatus and the charging engagement element of the unmanned aerial vehicle 100 may be coupled in other suitable manners such as, but not limited to, connecting, linking, clamping, clutching, capturing (with the engagement device as a net), a combination thereof, and/or the like. When the coupling has occurred, the unmanned aerial vehicle 100 may be at a coupling position/orientation.

Next at block B2240, at least a part of the unmanned aerial vehicle 100 may be repositioned for charging by the charging apparatus. In some embodiments, the coupling position/orientation may be the same as the position/orientation (charging position/orientation) of the unmanned aerial vehicle 100 as it is charged by the transfer unit. In such embodiments, block B2240 is moot.

In other embodiments, the unmanned aerial vehicle 100 may be repositioned to the charging position/orientation that is different from the coupling position/orientation, in the manner described. The charging position/orientation may be dependent on the structure of the unmanned aerial vehicle 100 as well as the charging apparatus. In particular, the manner in which the unmanned aerial vehicle 100 rests at the charging position/orientation may be different as compared to the manner in which the unmanned aerial vehicle 100 becomes coupled to the charging apparatus.

FIGS. 23-27 are conceptual diagrams illustrating examples of the process 2200 for positioning the unmanned aerial vehicle 100 (illustrated by the representative UAV 2320) for charging according to various embodiments. Referring to FIGS. 1-27, the representative UAV 2320 may be a simplified representation of the unmanned aerial vehicle 100 showing a charging engagement element 2330 (e.g., the front hooks 1810 and the hook members 1820) and a coupling sensor 2340 (e.g., at least one of the sensors 810). The coupling sensor 2340 may be any suitable sensor or cameras that determines the position/orientation of the unmanned aerial vehicle 100 with respect to the engagement device (e.g., a wire 2310) of the charging apparatus. Other parts of the unmanned aerial vehicle 100 are not shown for the sake of brevity and clarity.

The wire 2310 may be the engagement device of the charging apparatus. The cross section of the wire 2310 may be shown in FIGS. 23-27. The rest of the charging apparatus is not shown for the sake of brevity and clarity.

Figure 23:
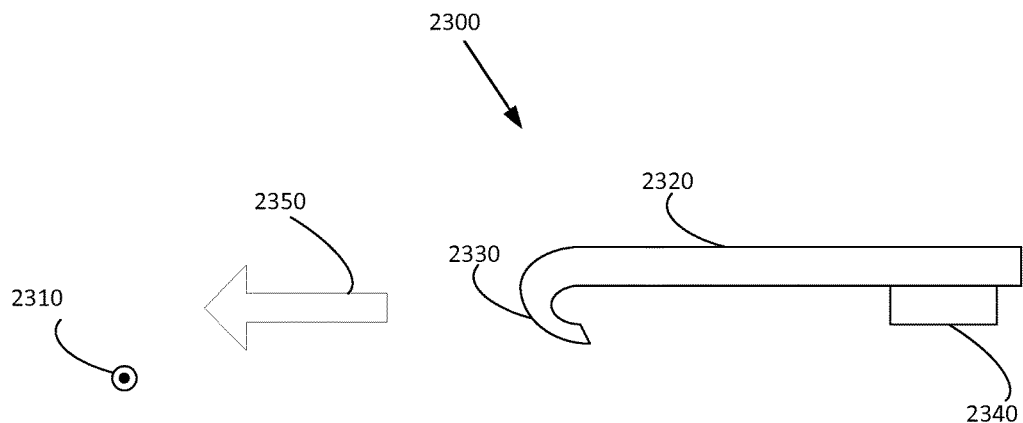
FIGS. 23-27 are conceptual diagrams illustrating examples of the method for positioning the unmanned aerial vehicle (illustrated by the representative) for charging according to various embodiments.

FIG. 23 illustrates the representative UAV 2320 in an initial position GX 5600 moving toward the predetermined position and orientation with respect to the charging apparatus (e.g., at block B2210). For example, the representative UAV 2320 may be moving in a first direction 2350 toward the wire 2310 initially. In some embodiments, the representative UAV 2320 may be moving in the first direction 2350 based on user input of the operator via suitable controls. In some embodiments, the representative UAV 2320 may be moving in the first direction 2350 based, at least in part, on the sensor output from the coupling sensor 2340. For example, the coupling sensor 2340 may be a camera mounted on the representative UAV 2320 providing the operator with images or videos of objects in front of (in the front direction 101) of the representative UAV 2320. In other examples, the processor 802 may automatically determine the first direction 2350 based on output provided by the coupling sensor 2340.

Figure 24:
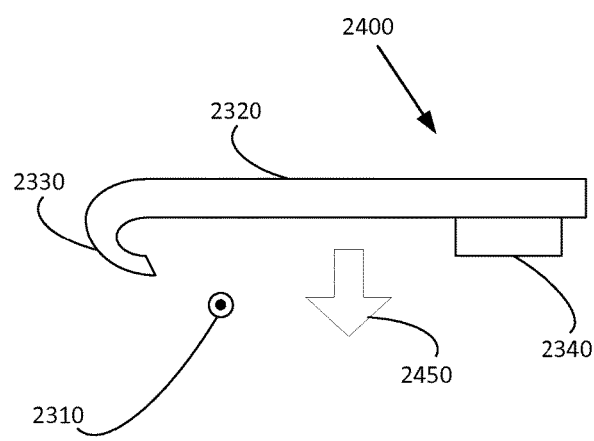

FIG. 24 illustrates the representative UAV 2320 being in the predetermined position and orientation GX 5700 with respect to the charging apparatus (e.g., B2220: YES). In the non-limiting example illustrated herein, the predetermined position and orientation of the representative UAV 2320 may include the representative UAV 2320 being directly above the wire 2310 after the charging engagement element 2330 of the representative UAV 2320 has passed over the wire 2310 in the first direction 2350. In other words, the wire 2310 may be in the bottom direction 106 with respect to the representative UAV 2320. The predetermined position and orientation of the representative UAV 2320 may also correspond to the charging engagement element 2330 (or at least the end portions of the charging engagement element 2330) surpassing the wire 2310 in the first direction 2350.

Figure 25:
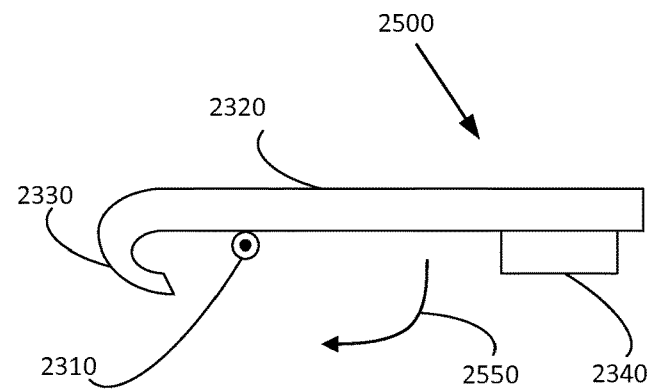

Once in the predetermined position and orientation, the representative UAV 2320 may be configured to move in a second direction 2450 to reach the coupling position and orientation (as shown in FIG. 25). The second direction 2450 may be substantially perpendicular to the first direction 2350. The second direction 2450 may be the bottom direction 106. In response to reaching the predetermined position and orientation, the processor 802 may cause the representative UAV 2320 to descend into the coupling position/orientation in the second direction 2450. In some embodiments, the processor 802 may cause the air propulsion motors 814 to decrease lift of the representative UAV 2320. In other embodiments, the processor 802 may simply cause the air propulsion motors 814 to shut off, allowing the representative UAV 2320 to free fall onto the wire 2310 into the coupling position/orientation.

Figure 26:
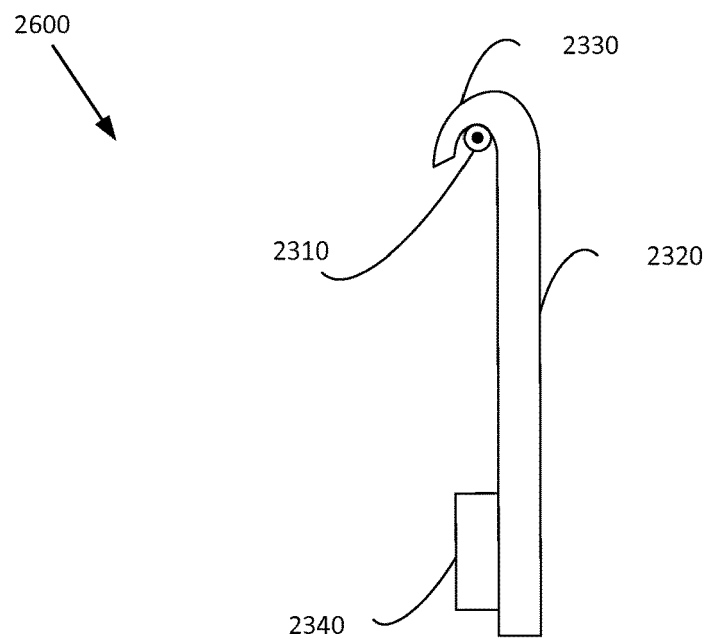

FIG. 25 illustrates the representative UAV 2320 in the coupling position/orientation 2500 with respect to wire 2310 of the charging apparatus (e.g., B2230). The representative UAV 2320 may fall onto the wire 2310 as it moves in the second direction 2450. At least a portion of the representative UAV 2320 may contact the wire 2310. Such portion may be a part of the charging engagement element 2330 or any other bottom portion that is positioned between the center of mass of the representative UAV 2320 and the charging engagement element 2330. This allows the body of the representative UAV 2320 to move in the third direction 2550 into the charging position and orientation as shown in FIG. 26 in a falling motion, as the air propulsion motors 814 may be shut off. The charging engagement element 2330 may accordingly be engaged (e.g., hooked) on the wire 2310.

FIG. 26 illustrates the representative UAV 2320 in a charging position and orientation 2600 with respect to wire 2310 of the charging apparatus (e.g., B2240). The representative UAV 2320 is shown to be at a perched position with the charging engagement element 2330 being hooked on the wire 2310. In other words, the representative UAV 2320 may be hung on the wire 2310.

The orientation of the representative UAV 2320 in the charging position and orientation 2600 may be substantially perpendicular to the representative UAV 2320 in the coupling position and orientation 2500, the predetermined position and orientation 2400, and/or the initial position and orientation 2300. In some embodiments, the representative UAV 2320 may not be perched at an exact perpendicular angle, given the mass distribution of the representative UAV 2320. The charging engagement element 2330 may serve as the charging device while the wire 2310 may be the transfer unit (e.g., including inductive coils or other elements for inductive or wired charging). Thus, power may be transferred from the wire 2310 to the charging engagement element 2330, where the power may be relayed to the energy storage devices of the representative UAV 2320. FIG. 26 may correspond to the process 2100a.

Figure 27:
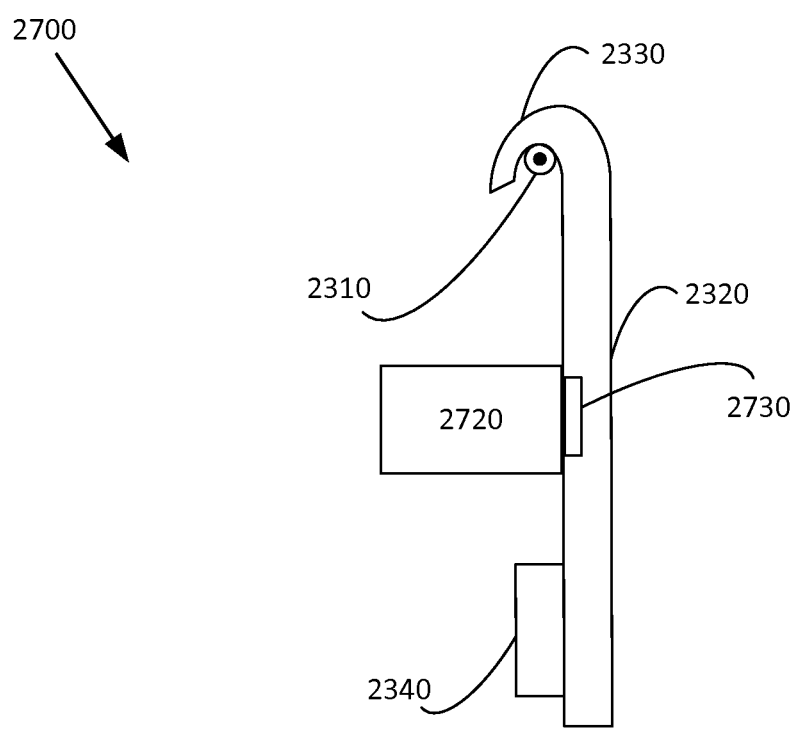

FIG. 27 illustrates the representative UAV 2320 in a charging position and orientation 2700 with respect to wire 2310 of the charging apparatus (e.g., B2240). The position and orientation of the representative UAV 2320 may the same or similar to shown with respect to FIG. 26. The charging apparatus may include a transfer unit 2720 that is a separate element than the wire 2310. The representative UAV 2320 may also include a charging device 2730 that is a separate element than the charging engagement element 2330. FIG. 27 may correspond to the process 2100b.

When the representative UAV 2320 is in the charging position/orientation 2700 as shown, the transfer unit 2720 and the charging device 2730 may come into contact or within an acceptable proximity for wired or wireless charging. Thus, power may be transferred from the transfer unit 2720 to the charging device 2730, where the power may be relayed to the energy storage devices of the representative UAV 2320. Cushions or other motion dampers may be provided at the transfer unit 2720, the charging device 2730, or both to reduce or prevent impact damage as the representative UAV 2320 moves from the coupling position/orientation 2500 to the charging position/orientation 2700 in the third direction 2550.

Figure 28:
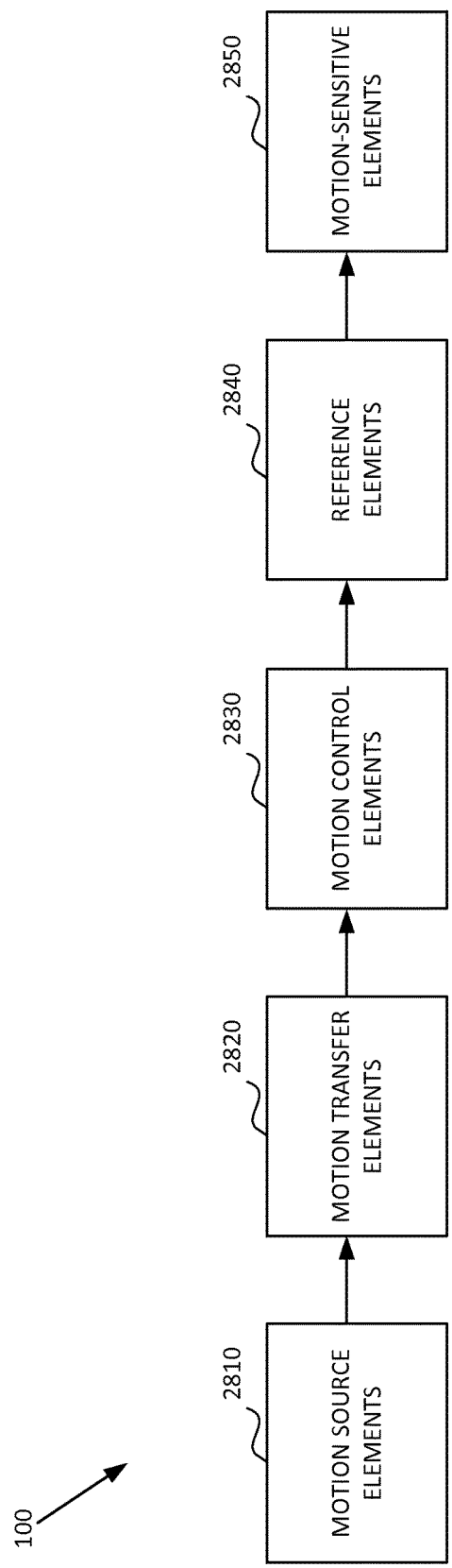
FIG. 28 shows a schematic diagram of various components of the unmanned aerial vehicle according to various embodiments.

FIG. 28 shows a schematic diagram of various components of the unmanned aerial vehicle 100 according to various embodiments. With reference to FIGS. 1-28, in some embodiments, the components of the unmanned aerial vehicle 100 may be reclassified based on motion, vibration, or other types of physical impact. The unmanned aerial vehicle 100 may include at least motion source elements 2810, motion transfer elements 2820, motion dampening elements 2830, reference elements 2840, and motion-sensitive elements 2850.

The motion source elements 2810 may include components of the unmanned aerial vehicle 100 that may generate motion, vibration, or other types of physical displacement with respect to the rest of the unmanned aerial vehicle 100. Such motion, vibration, or physical displacement may occur in addition to the motion of the unmanned aerial vehicle 100 as a whole. For example, the motion source elements 2810 may include the aerial propulsion devices 130, rotor motors 132, propellers 134, a combination thereof, and/or the like.

The motion transfer elements 2820 may include components of the unmanned aerial vehicle 100 that transfer or relay the motion, vibration, or other types of physical displacement to other components of the unmanned aerial vehicle 100. In some embodiments, the motion transfer elements 2820 may not generate motion by itself. In other embodiments, the motion transfer elements 2820 may itself be capable of motion generating as well as motion transfer. Examples of the motion transfer elements 2820 may include portions of the frame 110 (or any components) connected/linked to the motion source elements 2810, where each of the motion transfer elements 2820 may have material properties (e.g., rigidity) that are capable of substantially transfer motion to other components.

The motion-sensitive elements 2850 may include components of the unmanned aerial vehicle 100 that are sensitive to internal motion, vibration, or other types of physical displacement within the unmanned aerial vehicle 100. Such motion-sensitive elements 2850 may generally include motion-sensitive sensors (e.g., the sensor devices 199). The motion-sensitive sensors may include, but not limited to, depth-determining cameras, stereo cameras, motion sensor, accelerometer, a combination thereof, and/or the like. Such motion-sensitive elements 2850 may also include fragile components that may be damaged by motion within the unmanned aerial vehicle 100. In various embodiments, the motion-sensitive elements 2850 may be grouped together and installed on panels, sleds, plates, portions of the frame 110. Such on panels, sleds, plates, portions of the frame 110 may be the reference elements 2840.

The reference elements 2840 may include components of the unmanned aerial vehicle 100 connected or linked to the motion sensitive elements 2850. The reference elements 2840 may be bases or foundations on which the motion sensitive elements 2850 are provided. The reference elements 2840 may also be motion transfer elements 2820 given that the reference elements 2840 may be composed of material that is capable of substantially transferring motion from the motion source elements 2810 to the motion-sensitive elements 2850.

The motion dampening elements 2830 may be components of the unmanned aerial vehicle 100 that connect the motion transfer elements 2820 and the reference elements 2840. In addition, the motion dampening elements 2830 may be configured to dampen the motion from the motion transfer elements 2820 or the motion source elements 2810 themselves. As such, the motion felt by the reference elements 2840 and the motion-sensitive elements 2850 may be substantially reduced. The motion dampening elements 2830 may be components having flexible or elastic properties. Examples of the motion dampening elements 2830 may include, but not limited to, spring configurations, rubber grommets, shock absorbers, a combination thereof, and/or the like.

Figure 29:
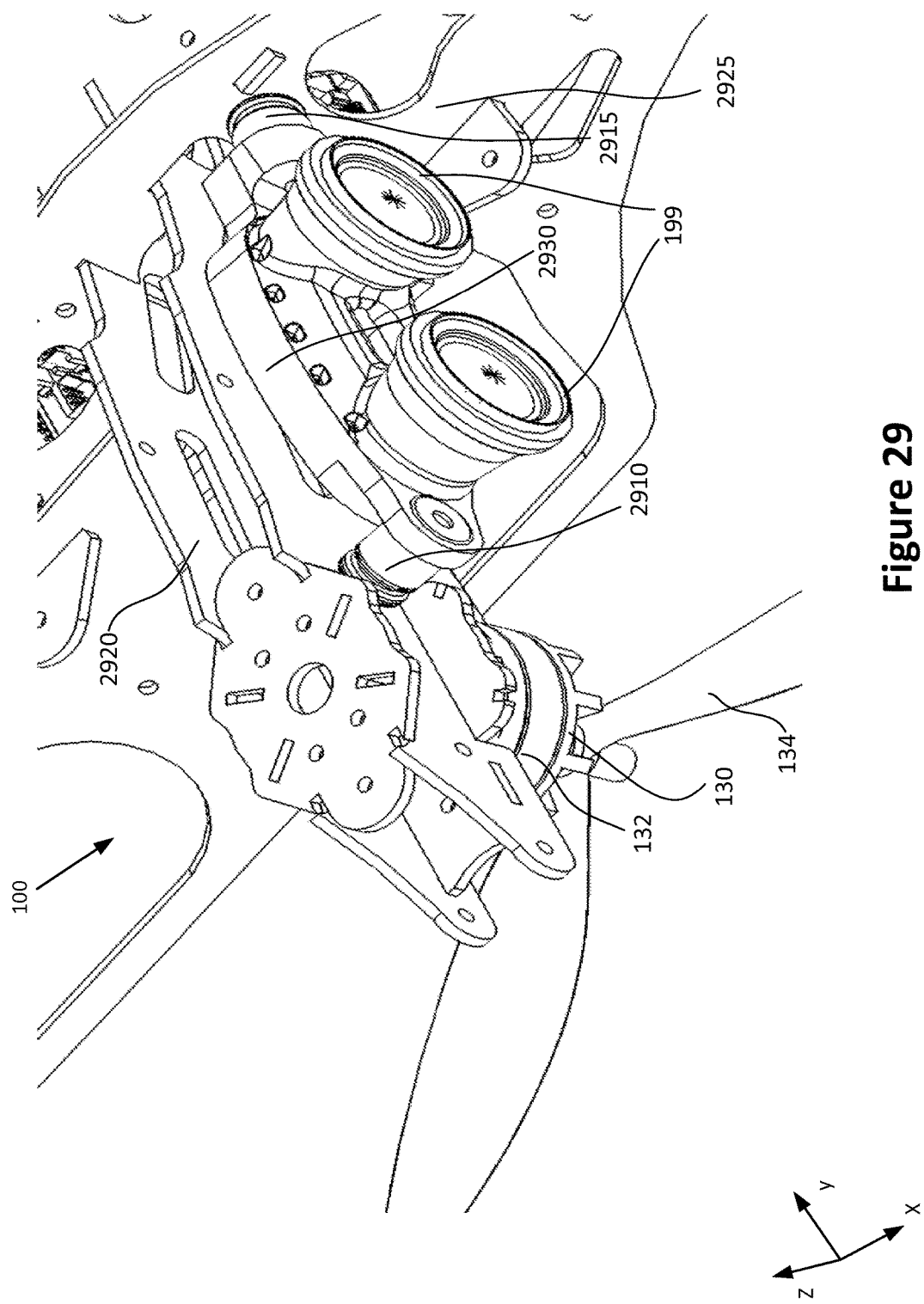
FIG. 29 is a perspective view of a portion of the unmanned aerial vehicle according to various embodiments.
Figure 30:
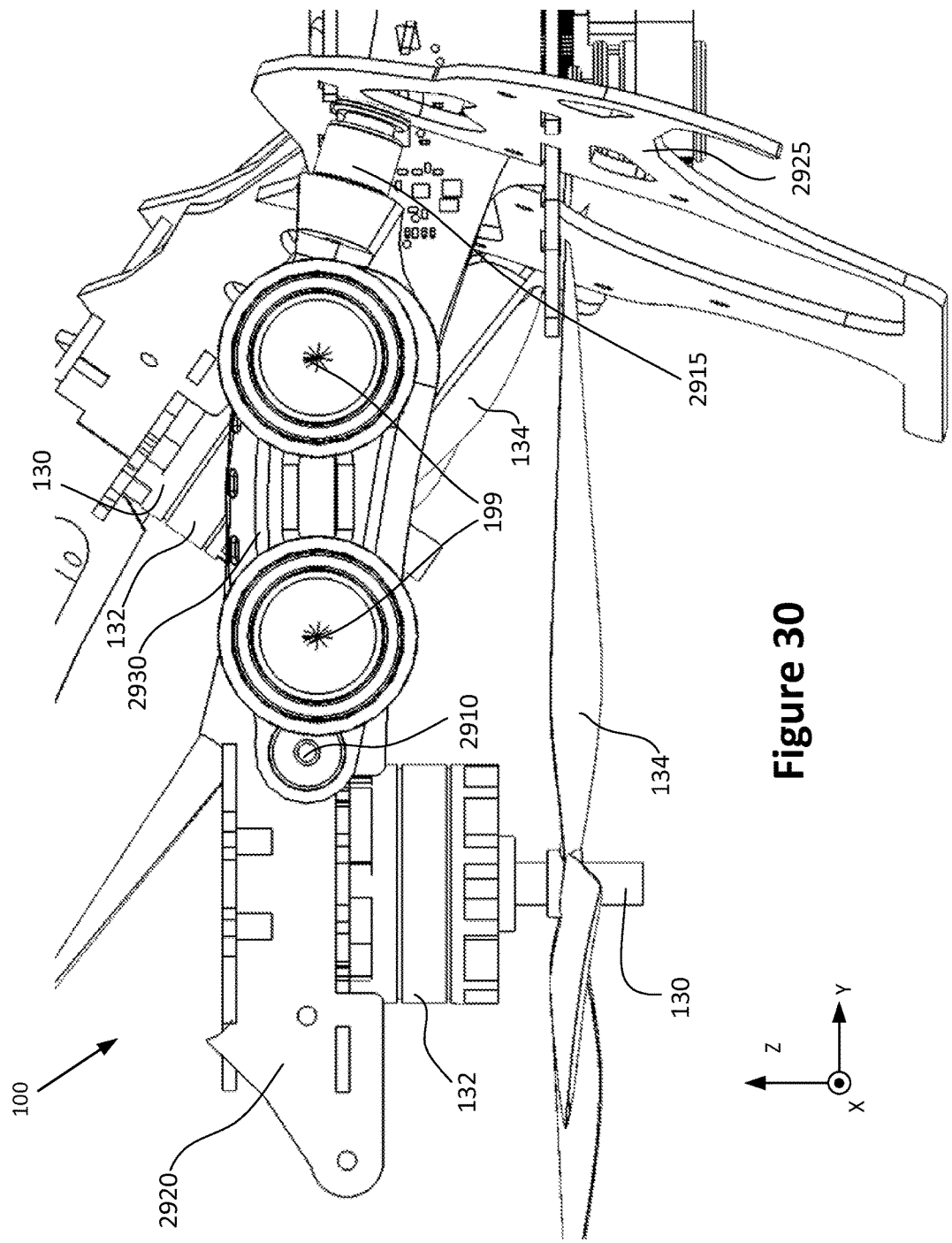
FIG. 30 is a front view of a portion of the unmanned aerial vehicle according to various embodiments.
Figure 31:
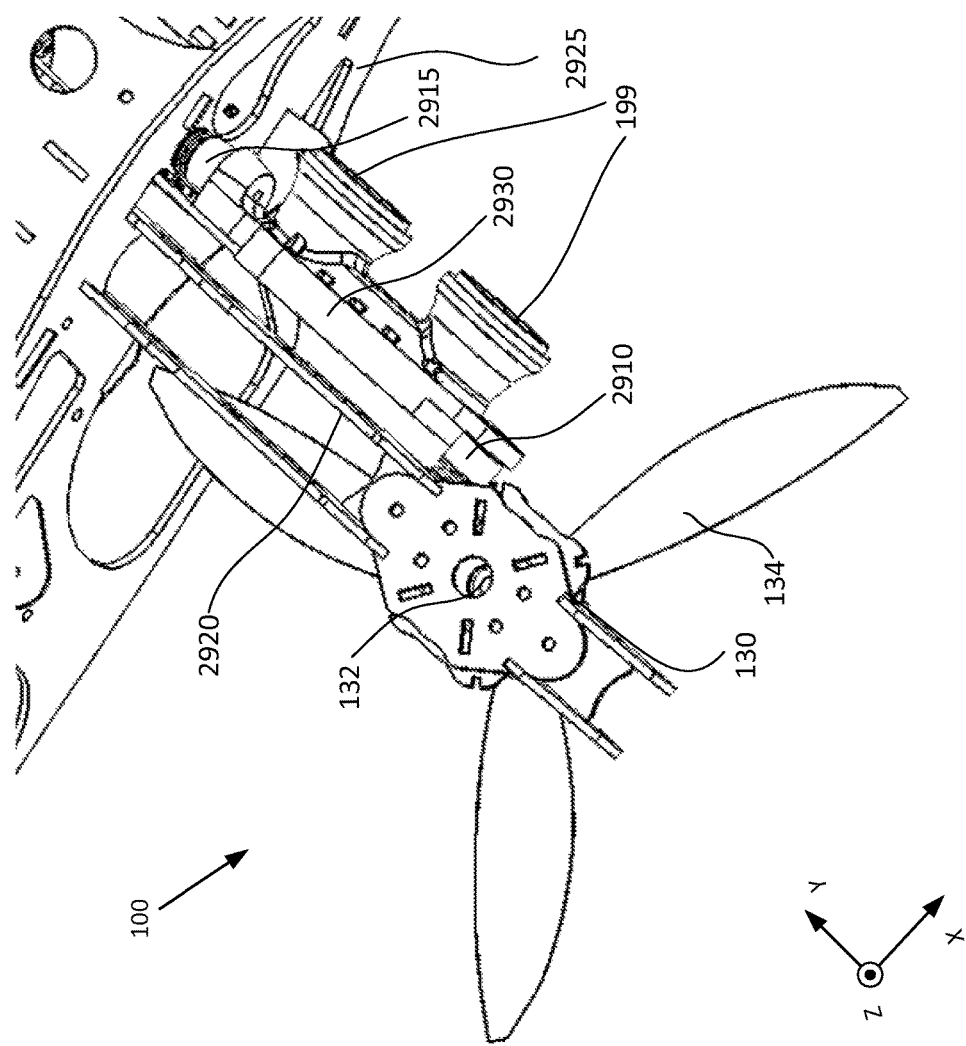
FIG. 31 is a top view of a portion of the unmanned aerial vehicle according to various embodiments.
Figure 32:
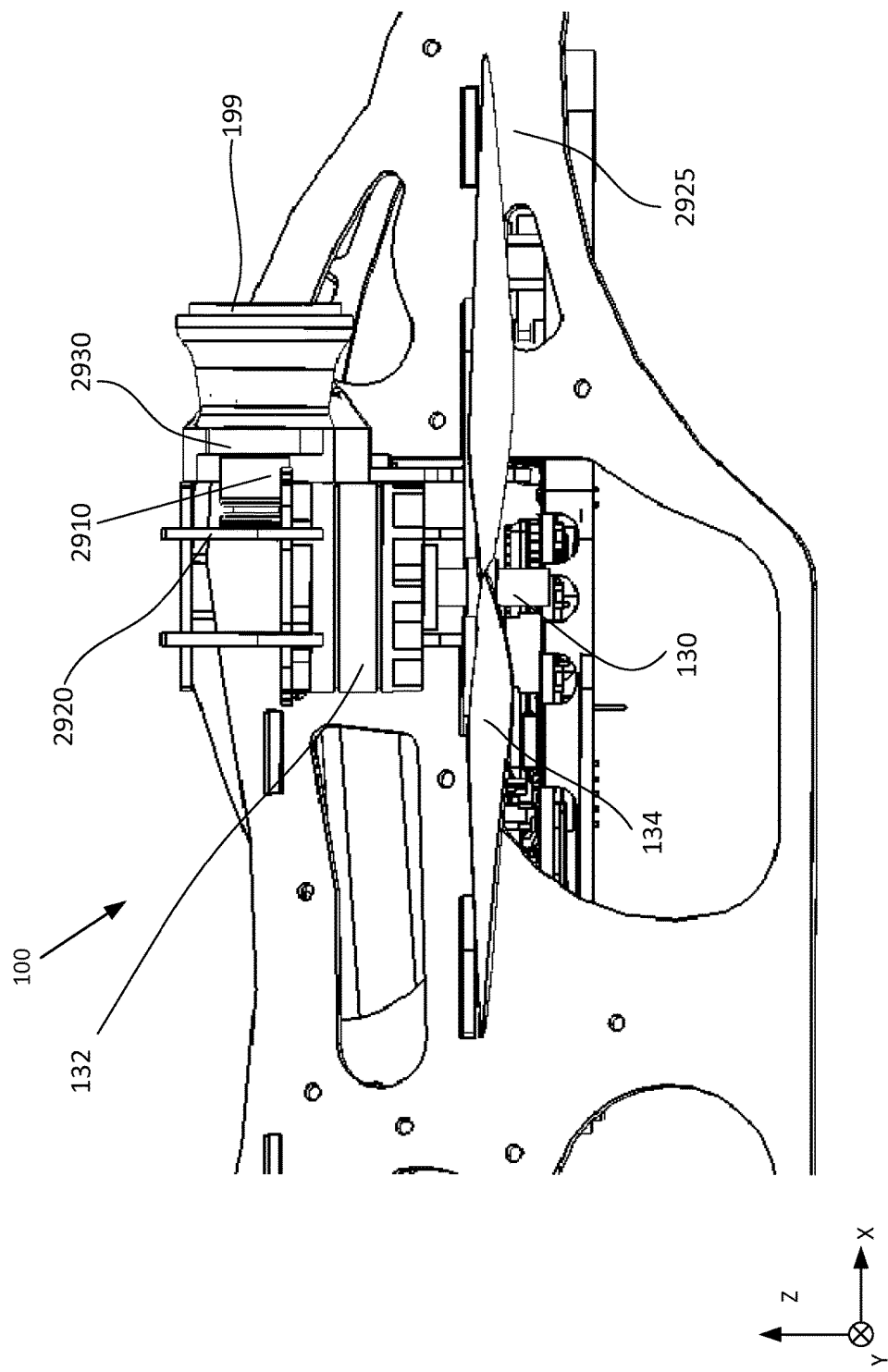
FIG. 32 is a side view of a portion of the unmanned aerial vehicle according to various embodiments.

FIG. 29 is a perspective view of a portion of the unmanned aerial vehicle 100 according to various embodiments. FIG. 30 is a front view of a portion of the unmanned aerial vehicle 100 according to various embodiments. FIG. 31 is a top view of a portion of the unmanned aerial vehicle 100 according to various embodiments. FIG. 32 is a side view of a portion of the unmanned aerial vehicle 100 according to various embodiments.

Referring to FIGS. 1-32, the unmanned aerial vehicle 100 may include the motion source elements 2810 such as, but not limited to, the aerial propulsion devices 130, rotor motors 132, and propeller 134. The unmanned aerial vehicle 100 may include the motion transfer elements 2820 such as, but not limited to, a first frame portion 2920 and a second frame portion 2925. The first frame portion 2920 and/or the second frame portion 2925 may be a portion of the frame 110.

The unmanned aerial vehicle 100 may additionally include the reference elements 2840 such as, but not limited to, the panel 2930. The panel 2930 may be provided at a front portion (at either side) of the unmanned aerial vehicle 100. A front surface of the panel 2930 may be facing in the front direction 101. In some embodiments, a surface of the first frame portion 2920 may be parallel to the front surface (and/or a rear surface) of the panel 2930. The unmanned aerial vehicle 100 may include the motion-sensitive elements 2850 such as, but not limited to the sensor devices 199. The sensor devices 199 may be provided on the panel 2930 in suitable configurations (e.g., at the front surface of the panel 2930).

In addition, the unmanned aerial vehicle 100 may be provided with the motion dampening elements 2830 including, but not limited to, a first damper unit 2910 and a second damper unit 2915. Each of the first damper unit 2910 and the second damper unit 2915 may be a cylindrical rubber grommet. The first damper unit 2910 may be positioned between the first frame portion 2920 and the panel 2930. The first damper unit 2910 may be provided at the rear surface of the panel 2930, the rear surface being opposite to the front surface. The second damper unit 2915 may be positioned between the second frame portion 2925 and the panel 2930. Given the flexible/elastic characteristics of the first damper unit 2910 and the second damper unit 2915, the impact of the motion/vibration caused by the aerial propulsion devices 130, rotor motors 132, and propeller 134 may be substantially reduced.

A first end of the first damper unit 2910 may be in contact or otherwise provided to the first frame portion 2920. A second end of the first damper unit 2910 may be in contact or otherwise provided to a first portion of the panel 2930. A first end of the second damper unit 2915 may be in contact or otherwise provided to the second frame portion 2925. A second end of the second damper unit 2915 may be in contact or otherwise provided to a second portion of the panel 2930.

For example, the motion/vibration caused by the aerial propulsion devices 130, rotor motors 132, and propeller 134 may be felt by the first frame portion 2920 and the second frame portions 2925. The first frame portion 2920 and the second frame portions 2925 may transfer the motion/vibration to the first damper unit 2910 and the second damper unit 2915, respectively. The motion/vibration may then be attenuated due to the material properties of the first damper unit 2910 and the second damper unit 2915. Accordingly, the panel 2930 and the sensor devices 199 received on the panel 2930 may receive only a fraction of the motion/vibration originally caused by the aerial propulsion devices 130, rotor motors 132, and propeller 134.

In some embodiments, the first damper unit 2910 (extending along the x-direction) may be perpendicular to the surface of the first frame portion 2920 (extending along the y-z plane) and/or a surface of the panel 2930 (extending along the y-z plane). Thus, the first damper unit 2910 is adapt at attenuating the motion/vibration propagated through the first damper unit 2910 in the x-direction.

In some embodiments, the second damper unit 2915 (extending along a direction having a x-direction component, y-direction component, and z-direction component) may be substantially perpendicular to a surface of the second frame portion 2925 (extending along a direction having a x-direction component, y-direction component, and a z-direction component) and/or a surface of the panel 2930. Thus, the second damper unit 2915 is adapt at attenuating the motion/vibration propagated through the second damper unit 2915 in the x-direction, y-direction, and z-direction.

One of the ordinary skill in the art would appreciate that various embodiments are illustrate non-limiting examples of the motion dampening elements 2830. Further examples include the damper units (e.g., the first damper unit 2910, the second damper unit 2915, and/or the like) extending in two or more directional axes. This allows damping of momentum/force in multiple directions to allow improved stability as compared in damping in only one directional axis.

Figure 33:
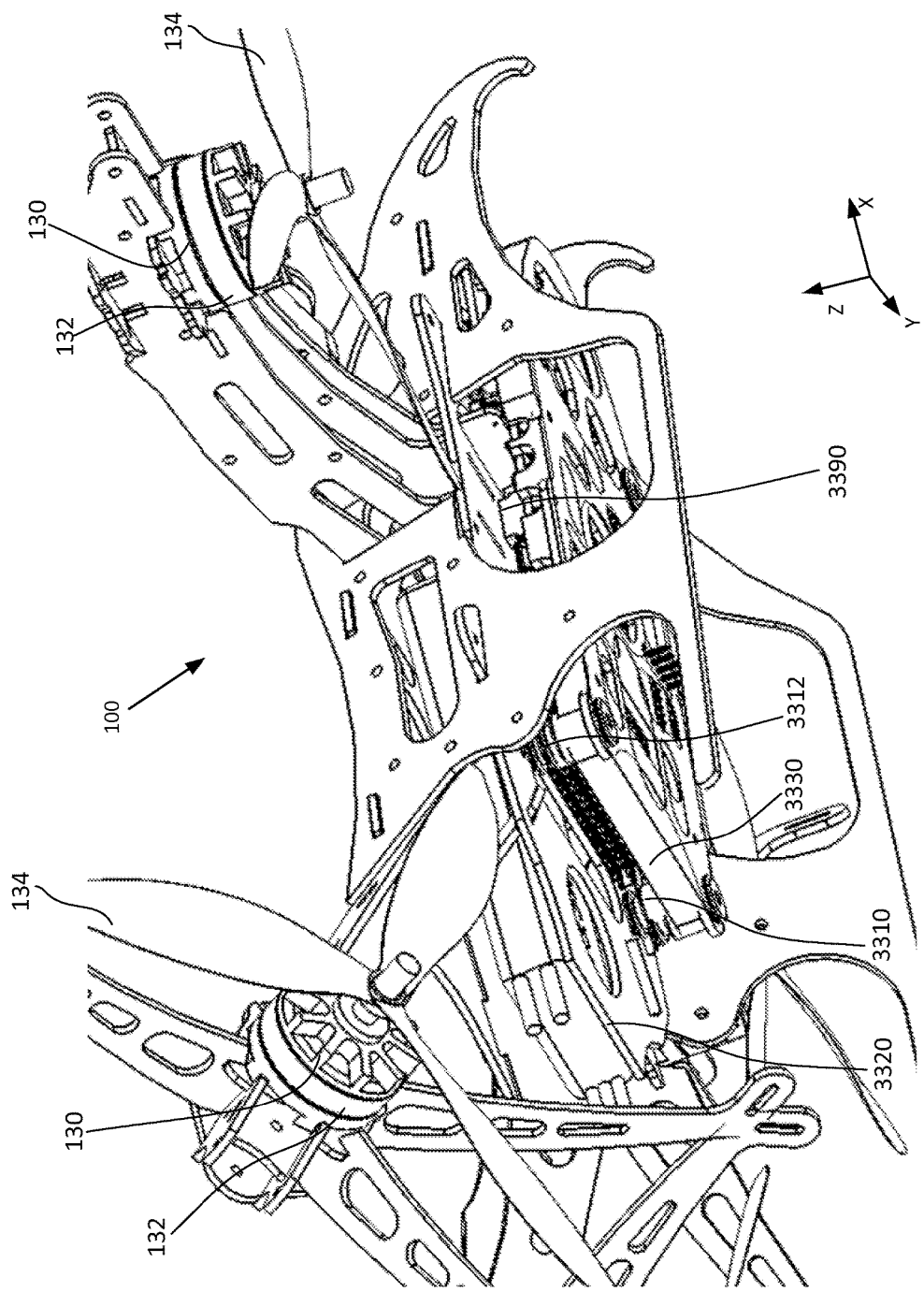
FIG. 33 is a perspective view of a portion of the unmanned aerial vehicle according to various embodiments.
Figure 34:
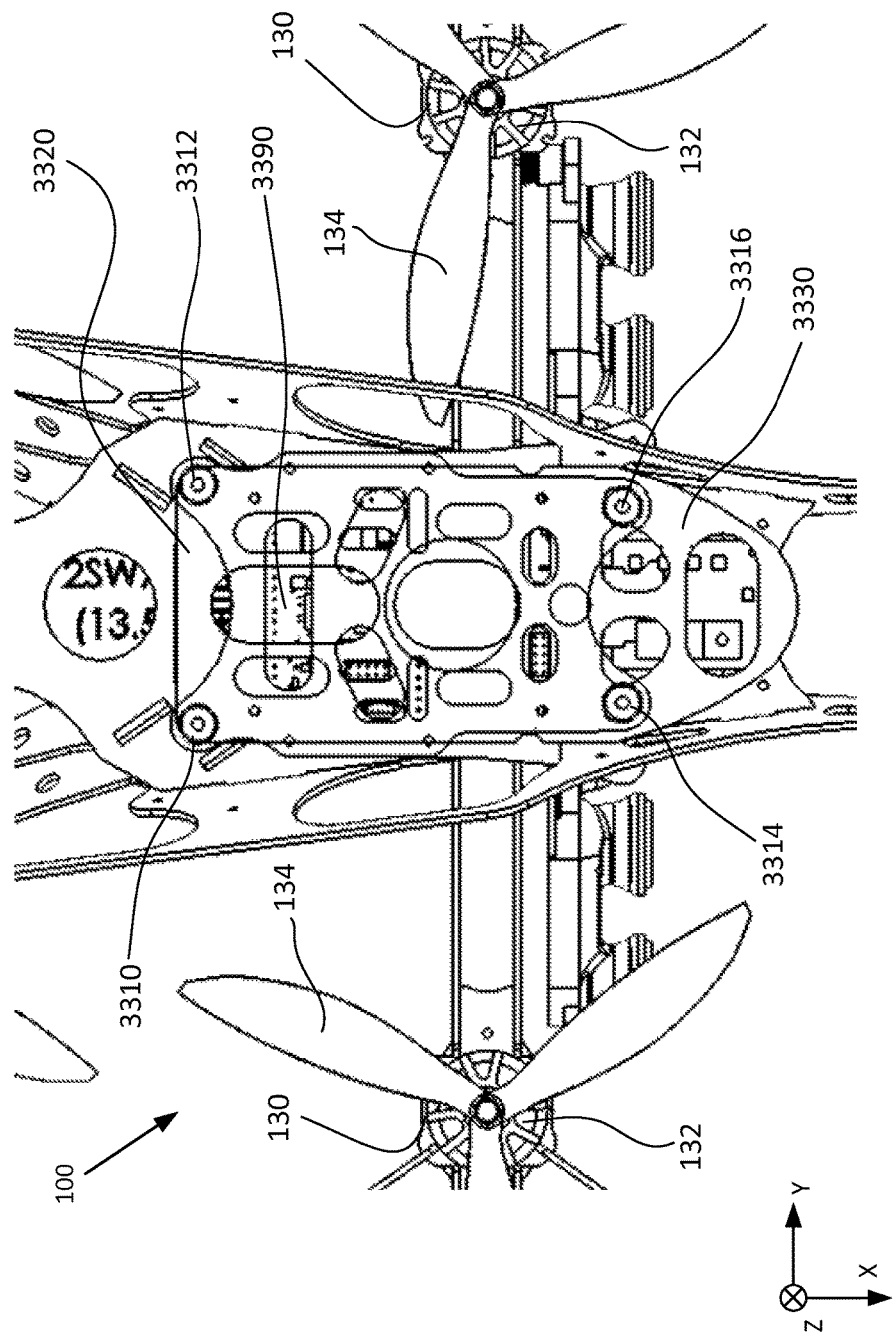
FIG. 34 is a bottom view of a portion of the unmanned aerial vehicle according to various embodiments.
Figure 35:
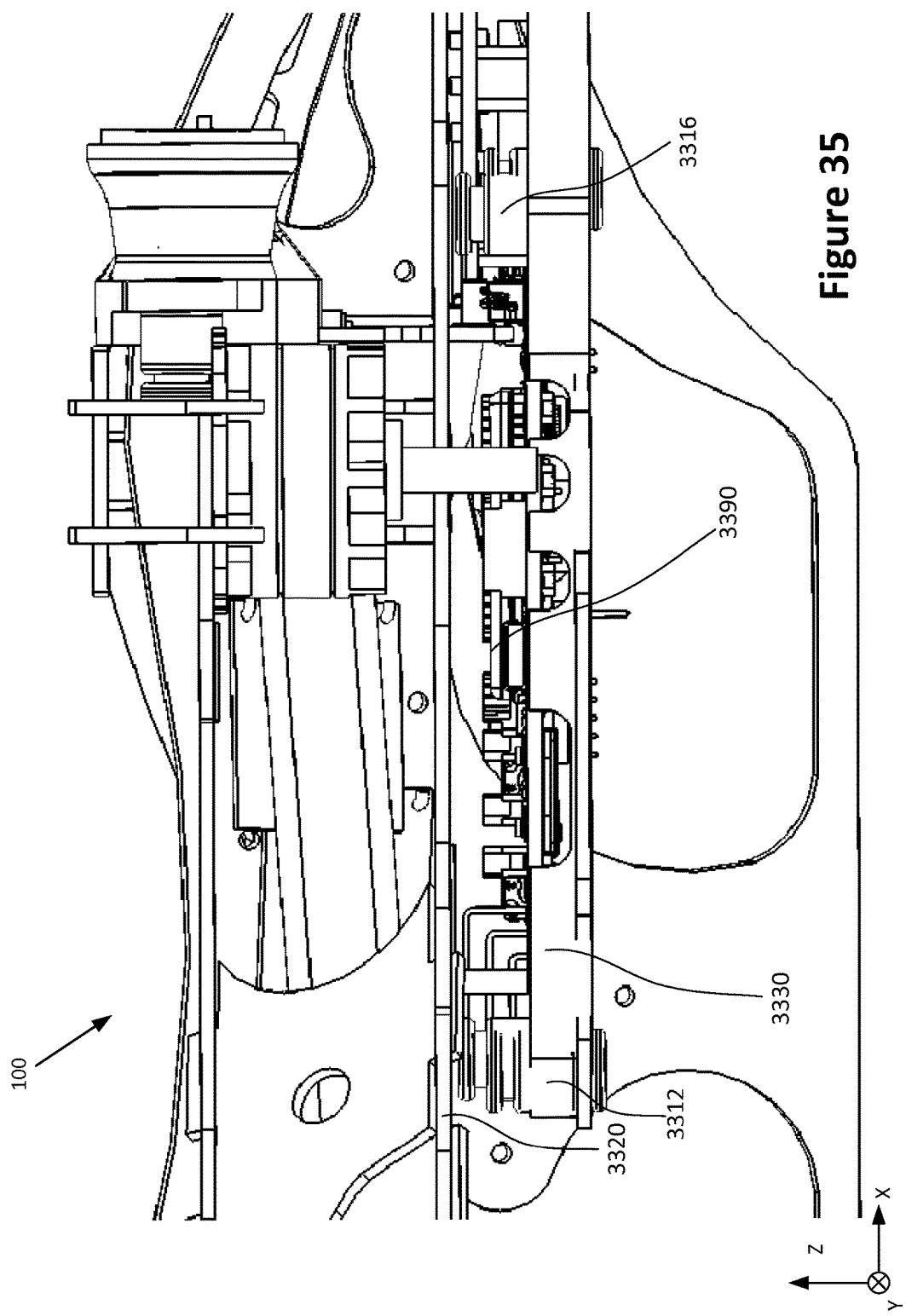
FIG. 35 is a side view of a portion of the unmanned aerial vehicle according to various embodiments.
Figure 36:
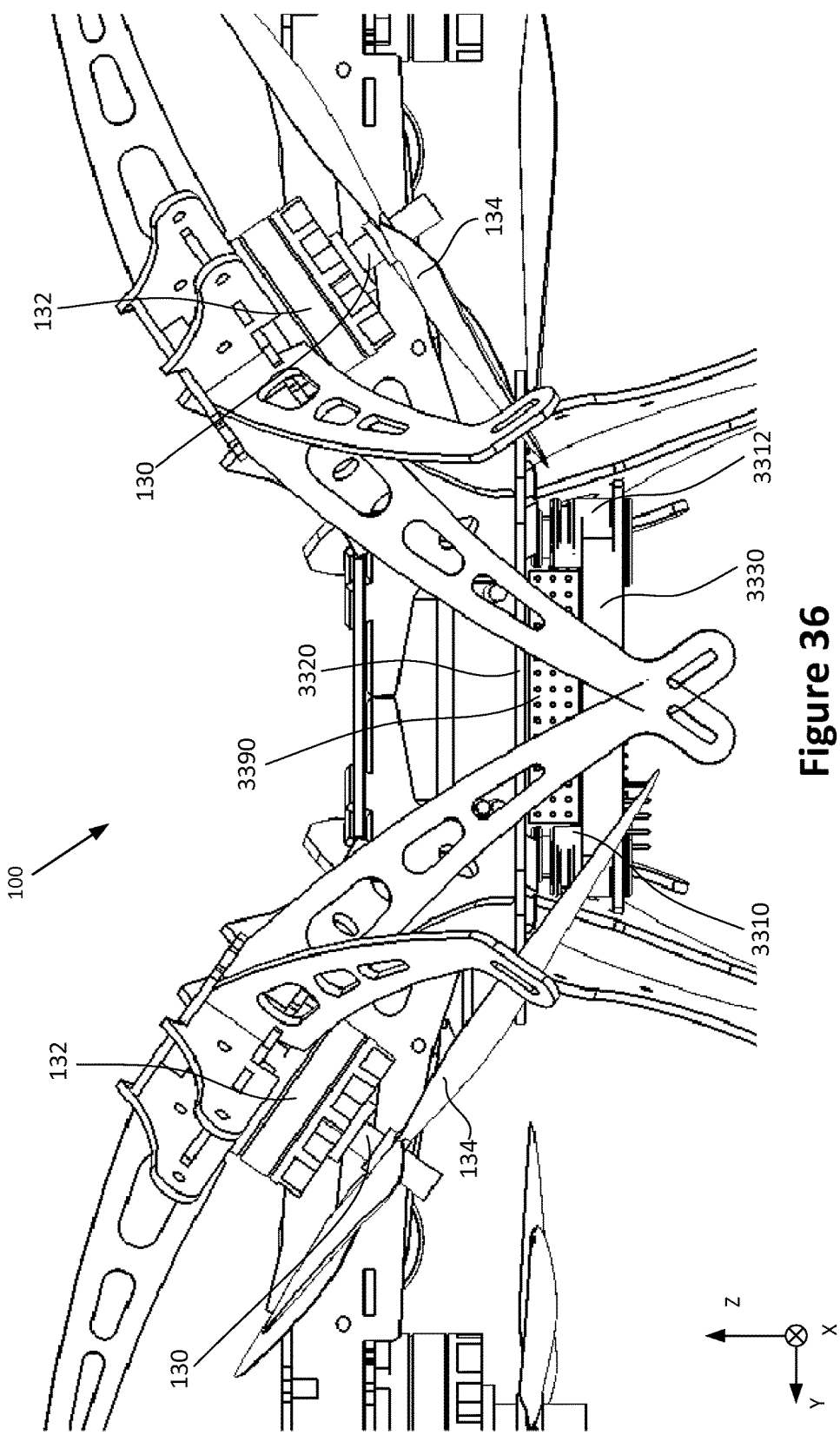
FIG. 36 is a rear view of a portion of the unmanned aerial vehicle according to various embodiments.

FIG. 33 is a perspective view of a portion of the unmanned aerial vehicle 100 according to various embodiments. FIG. 34 is a bottom view of a portion of the unmanned aerial vehicle 100 according to various embodiments. FIG. 35 is a side view of a portion of the unmanned aerial vehicle 100 according to various embodiments. FIG. 36 is a rear view of a portion of the unmanned aerial vehicle 100 according to various embodiments. FIGS. 33-36 illustrates embodiments in which motion/vibration impacts electronics 3390 (such as the sensors 199, 810, and/or electronic components) may be reduced by damper units 3310, 3312, 3314, and 3316 in a sled configuration.

Referring to FIGS. 1-36, the unmanned aerial vehicle 100 may include motion source elements 2810 such as, but not limited to, the aerial propulsion devices 130, rotor motors 132, and propeller 134. The unmanned aerial vehicle 100 may include motion transfer elements 2820 such as, but not limited to, a base frame 3320. The base frame 3320 may be a portion of the frame 110. The unmanned aerial vehicle 100 may additionally include reference elements 2840 such as, but not limited to, a sled plate 3330. The sled plate 3330 may be provided at a bottom portion of the unmanned aerial vehicle 100 and is in the bottom direction 106 as compared to the rest of the unmanned aerial vehicle 100. A top surface of the sled plate 3330 may be facing in the top direction 105. In some embodiments, a surface of the base frame 3320 may be parallel to the top surface (and/or a bottom surface) of the sled plate 3330. The unmanned aerial vehicle 100 may include the motion-sensitive elements 2850 such as, but not limited to, the electronics 3390. The electronics 3390 may be suitable sensors and may be provided on sled plate 3330 in suitable configurations.

In addition, the unmanned aerial vehicle 100 may be provided motion dampening elements 2830 including, but not limited to, a third damper unit 3310, fourth damper unit 3312, fifth damper unit 3314, and sixth damper unit 3316. Each of the third damper unit 3310, fourth damper unit 3312, fifth damper unit 3314, and sixth damper unit 3316 may be a cylindrical rubber grommet. Each of the third damper unit 3310, fourth damper unit 3312, fifth damper unit 3314, and sixth damper unit 3316 may be positioned between the base frame 3320 and the sled plate 3330. For example, each of the third damper unit 3310, fourth damper unit 3312, fifth damper unit 3314 (or vice versa), and sixth damper unit 3316 may be provided at the top surface of the sled plate 3330, the top surface being opposite to the bottom surface of the sled plate 3330. Given the flexible/elastic characteristics of the third damper unit 3310, fourth damper unit 3312, fifth damper unit 3314, and sixth damper unit 3316, the impact of the motion/vibration caused by the aerial propulsion devices 130, rotor motors 132, and propeller 134 may be substantially reduced.

A first end of each of the third damper unit 3310, fourth damper unit 3312, fifth damper unit 3314, and sixth damper unit 3316 may be in contact or otherwise provided to the base frame 3320. A second end of the each of the third damper unit 3310, fourth damper unit 3312, fifth damper unit 3314, and sixth damper unit 3316 may be in contact or otherwise provided to top surface of the sled plate 3330.

For example, the motion/vibration caused by the aerial propulsion devices 130, rotor motors 132, and propeller 134 may be felt by the base frame 3320. The base frame 3320 may transfer the motion/vibration to the third damper unit 3310, fourth damper unit 3312, fifth damper unit 3314, and sixth damper unit 3316. The motion/vibration may then be attenuated due to the material properties of the third damper unit 3310, fourth damper unit 3312, fifth damper unit 3314, and sixth damper unit 3316. Accordingly, the sled plate 3330 and the electronics 3390 received on the sled plate 3330 may receive only a fraction of the motion/vibration originally caused by the aerial propulsion devices 130, rotor motors 132, and propeller 134.

In some embodiments, the third damper unit 3310, fourth damper unit 3312, fifth damper unit 3314, and sixth damper unit 3316 may extend alone the z-direction. The third damper unit 3310, fourth damper unit 3312, fifth damper unit 3314, and sixth damper unit 3316 may be perpendicular to the surface of the base frame 3320 (extending in the x/y plane) and/or the top surface (and/or a bottom surface) of the sled plate 3330 (extending in the x/y plane). Thus, the third damper unit 3310, fourth damper unit 3312, fifth damper unit 3314, and sixth damper unit 3316 may be adapt at attenuating the motion/vibration propagated through each of the third damper unit 3310, fourth damper unit 3312, fifth damper unit 3314, and sixth damper unit 3316 in the z-direction.

Loads such as the electronics 3390 may be carried at either the top surface or the bottom surface of the sled plate 3330. In some embodiments, loads may be provided to be carried by the sled plate 3330 in any suitable manner to aggregate a weight of sufficient mass to stabilize flight and further dampen motions caused by the motion dampening elements 2830. For example, heavy loads carried at the sled plate 3330 may cause higher inertia associated with the loads and the sled plate 3330. Higher inertia will, in turn, further cause the loads and the sled plate 3330 to be resistant to movement. Therefore, heavier components such as batteries, PCDs, sensor, and/or the like may be provided as loads. In some embodiments, the loads, including the sled plate 3330, may be detachable.

Figure 37:
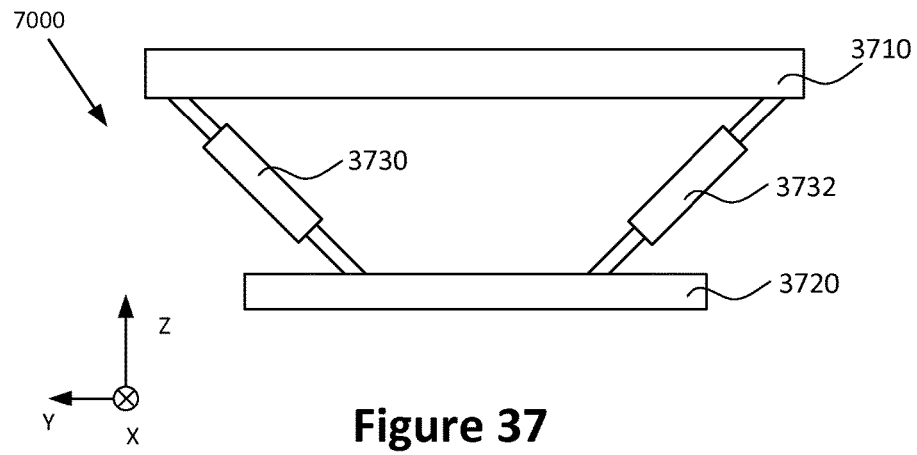
FIG. 37 shows a rear view of a portion of a schematic representation of a damping system according to various embodiments.
Figure 38:
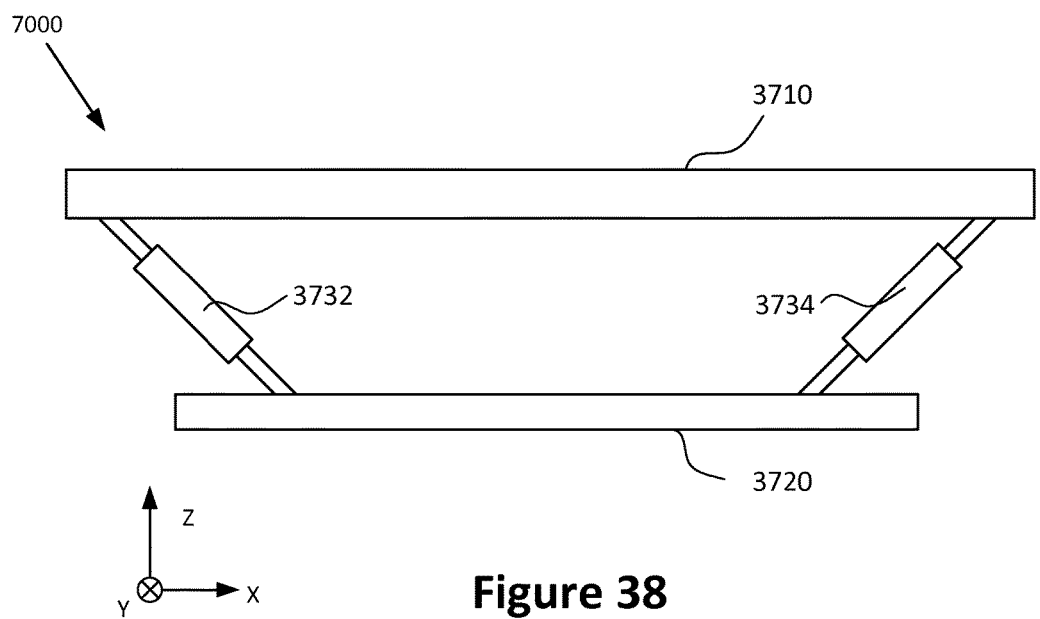
FIG. 38 is a side view of a portion of the schematic representation of the damping system according to various embodiments.

FIG. 37 shows a rear view of a portion of a schematic representation of a damping system 7000 according to various embodiments. FIG. 38 is a side view of a portion of the schematic representation of the damping system 7000 according to various embodiments. The schematic representation 7000 may be a simplified diagram of a portion of the unmanned aerial vehicle 100. The FIGS. 37 and 38 may illustrate embodiments of the motion dampening elements 2830 (e.g., FIG. 28) having components in three coordinate axes for dampening of motion and vibration in all directions.

With reference to FIGS. 1-38, in some embodiments, a first plate 3710 may correspond to any motion transfer elements 2820 described herein. A second plate 3720 may correspond to any reference elements 2840 described herein. A first damper 3730, a second damper 3732, and a third damper 3734 may correspond to any motion dampening elements 2830 described herein.

In some embodiments, the first damper 3730, second damper 3732, and third damper 3734 may be angled at an angel with respect to each of the first plate 3710 and the second plate 3720 in the x-direction, the y-direction, and the z-direction. The angles may include, but not limited to, 30 degrees, 45 degrees, 60 degrees, and/or the like. By virtue of the first damper 3730, second damper 3732, and third damper 3734 having directional elements in all three axes, motion/vibration in any of the directions may be reduced.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

What is claimed is:

1. An unmanned aerial vehicle, comprising:
a frame portion oriented on a horizontal plane;
two rear arms extending away in fixed directions from the frame portion at an acute angle relative to one another to form a V-shape between the two rear arms;
two rear air propulsion devices, each coupled to a corresponding one of the rear arms and each having an axis of rotation including a component in a bottom direction perpendicular to the horizontal plane and including a component in a side direction coplaner with the horizontal plane;
two front arms parallel to each other and extending away in fixed directions from the frame portion along the horizontal plane, wherein ends of the two rear arms are elevated, relative to the two front arms, in a top direction; and
two front air propulsion devices, each coupled to a corresponding one of the front arms and each having an axis of rotation in the bottom direction.

2. The unmanned aerial vehicle of claim 1, wherein each of the front air propulsion devices is configured to face the bottom direction.

3. The unmanned aerial vehicle of claim 1, wherein:
the axis of rotation of a first of the rear air propulsion devices comprises a first direction forming an acute angle with the bottom direction; and
the axis of rotation of a second of the rear air propulsion devices comprises a second direction forming an acute angle with the bottom direction, wherein the first direction is different than the second direction.

4. The unmanned aerial vehicle of claim 1, wherein the axis of rotation of each of the rear air propulsion devices is fixed.

5. The unmanned aerial vehicle of claim 1, wherein the axis of rotation of each of the front air propulsion devices is fixed.

6. The unmanned aerial vehicle of claim 1, wherein the axis of rotation component in the bottom direction is configured for lift, and the axis of rotation component in the side direction is configured for rotation.

7. The unmanned aerial vehicle of claim 1, further comprising a charging engagement element.

8. The unmanned aerial vehicle of claim 1, further comprising:
a camera configured to face a front direction and vibration isolated from the front air propulsion devices.

9. The unmanned aerial vehicle of claim 8, wherein:
at least one of the front arms comprises a frame and a panel;
the camera is arranged on the panel; and
the at least one front air propulsion device is arranged on the frame.

10. The unmanned aerial vehicle of claim 9, further comprising a vibration dampener between the panel and the frame.

11. The unmanned aerial vehicle of claim 7, wherein the charging engagement element is configured to charge the unmanned aerial vehicle.

12. The unmanned aerial vehicle of claim 11, wherein the charging engagement element includes a number of hook members.

13. The unmanned aerial vehicle of claim 12, wherein the number of hook members are part of the frame portion.

14. The unmanned aerial vehicle of claim 13, wherein each of the number of hook members extends from the frame portion in a different direction.

15. A method of providing an unmanned aerial vehicle, comprising:
providing a frame portion oriented on a horizontal plane;
providing two rear arms extending away in fixed directions from the frame portion at an acute angle relative to one another to form a V-shape between the two rear arms;
providing two rear air propulsion devices, each coupled to a corresponding one of the rear arms and each having an axis of rotation including a component in a bottom direction perpendicular to the horizontal plane and including a component in a side direction coplaner with the horizontal plane;
providing two front arms parallel to each other and extending away in fixed directions from the frame portion along the horizontal plane, wherein ends of the two rear arms are elevated, relative to the two front arms, in a top direction; and
providing two front air propulsion devices, each coupled to a corresponding one of the front arms and each having an axis of rotation in the bottom direction.

16. The method of claim 15, wherein each of the front air propulsion devices is configured to face the bottom direction.

17. The method of claim 15, wherein the axis of rotation component in the bottom direction is configured for lift, and the axis of rotation component in the side direction is configured for rotation.

18. The method of claim 15, further comprising:
providing a charging engagement element configured to charge the unmanned aerial vehicle.

19. The method of claim 15, wherein:
the axis of rotation of a first of the rear air propulsion devices comprises a first direction forming an angle with the bottom direction; and
the axis of rotation of a second of the rear air propulsion devices comprises a second direction forming an angle with the bottom direction, wherein the first direction is different than the second direction.

20. The method of claim 19, wherein the first and second directions are orthogonal to each other.

21. The method of claim 15, further comprising:
providing a camera configured to face a front direction.

22. The method of claim 21, wherein the camera is vibration isolated from the front air propulsion devices.

23. An unmanned aerial vehicle, comprising:
a frame portion oriented on a horizontal plane;
first and second rear arms extending away in fixed directions from the frame portion at acute angles relative to one another to form a V-shape between the first and second rear arms;

a first rear air propulsion device coupled to the first rear arm and having a fixed axis of rotation in a first direction non-orthogonal to the horizontal plane;

a second rear air propulsion device coupled to the second rear arm and having a fixed axis of rotation in a second direction non-orthogonal to the horizontal plane, wherein the first and second directions are orthogonal to each other; and first and second front arms parallel to each other and extending away in fixed directions from the frame portion along the horizontal plane.

24. The unmanned aerial vehicle of claim 23, wherein ends of the rear arms are elevated, relative to the front arms, in a top direction.

25. The unmanned aerial vehicle of claim 23, further comprising:

a first front air propulsion device coupled to the first front arm and having an axis of rotation in a bottom direction perpendicular to the horizontal plane; and a second front air propulsion device coupled to the second front arm and having an axis of rotation in the bottom direction.

26. The unmanned aerial vehicle of claim 25, wherein the axis of rotation of each of the front air propulsion devices is fixed.

27. The unmanned aerial vehicle of claim 23, further comprising a charging engagement element configured to charge the unmanned aerial vehicle.

28. The unmanned aerial vehicle of claim 27, wherein the charging engagement element includes a number of hook members extending from the frame portion in a different direction.

* * * * *